US012769667B1

(12) United States Patent
Ji et al.

(10) Patent No.: US 12,769,667 B1
(45) Date of Patent: Oct. 20, 2026

(54) TRANSLATION INVALIDATION FILTERING BASED ON A CONTEXT TABLE WITHIN A PROCESSOR CORE

(71) Applicant: GOOGLE LLC, Mountain View, CA (US)

(72) Inventors: Jyunneng Ji, New Taipei City (TW); Leigang Kou, Austin, TX (US); Hok Kiu Nicholas Tsang, Austin, TX (US); Krishnakumar Ganapathy, Bee Cave, TX (US); Sadayan Ghows Ghani Sadayan Ebramsah Mo Abdul, Austin, TX (US); Samuel David Kirchhoff, Dripping Springs, TX (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/225,679

(22) Filed: Jun. 2, 2025

(51) Int. Cl.
*G06F 12/0891* (2016.01)
*G06F 9/30* (2018.01)
*G06F 12/0864* (2016.01)
*G06F 12/1045* (2016.01)

(52) U.S. Cl.
CPC ...... *G06F 12/0891* (2013.01); *G06F 9/30043* (2013.01); *G06F 12/0864* (2013.01); *G06F 12/1045* (2013.01)

(58) Field of Classification Search
None
See application file for complete search history.

(56) References Cited

U.S. PATENT DOCUMENTS

2004/0218819 A1* 11/2004 Satoh .................... H04N 19/42 382/232
2020/0371951 A1* 11/2020 Chatterjee ............... G06F 12/10
2022/0374235 A1* 11/2022 Thottethodi ........ G06F 12/0875

FOREIGN PATENT DOCUMENTS

JP 2013093045 A * 5/2013 ........... G06F 9/4812

OTHER PUBLICATIONS

"Versal Adaptive SoC CPM Mode for PCI Express—Tracking ATS Invalidate Request Message", Yang et al., p. 1-9. (Year: 2024).*

* cited by examiner

*Primary Examiner* — Brian R Peugh
(74) *Attorney, Agent, or Firm* — Brake Hughes Bellermann LLP

(57) ABSTRACT

Implementations described herein relate to filtering translation invalidation messages within a core of a processor based on a context table. A core may include an address translation cache and a context table storing contexts in which the core has operated. A translation invalidation controller within the core may identify a context from a received translation invalidation message. Based on the context and the context table, the controller may determine if the address translation cache lacks entries targeted by the message. If so, the message may be discharged without accessing the address translation cache. This can reduce latency and processing overhead by avoiding unnecessary scans of the address translation cache for irrelevant messages. Corresponding processors and cores are also disclosed.

20 Claims, 14 Drawing Sheets

TRANSLATION INVALIDATION FILTERING BASED ON A CONTEXT TABLE WITHIN A PROCESSOR CORE

BACKGROUND

Processors such as central processing units (CPUs) are configured to operate by executing instructions within software code. In some cases, multiple software instances (e.g., software programs, applications, threads, subroutines, etc.) may be executed concurrently using a plurality of different processing cores included within a multi-core processor. Even as different software instances are being executed in parallel by different cores, however, certain computing resources (e.g., main memory, auxiliary processing resources, peripheral input/output devices, etc.) may be shared by all the processing cores. To facilitate this shared resource usage, address translation techniques allow for different software instances to operate within distinct (e.g., non-shared) virtual address spaces while sharing access to global resources that operate within a singular (e.g., shared) physical address space. To implement address translation between these virtual and physical address spaces quickly and efficiently, processors may implement address translation caching (e.g., using translation lookaside buffers, etc.).

SUMMARY

Respective address translation caches (e.g., translation lookaside buffers (TLBs)) may be maintained by each core of a multi-core processor (e.g., a multi-core central processing unit (CPU)) to keep track of which physical addresses are referred to by various virtual addresses in different contexts (e.g., associated with different software instances). Occasionally, it may be desirable to invalidate the mapping of one or more blocks of virtual addresses to their corresponding physical addresses. For example, the virtual addresses may no longer be in use (e.g., because a software process terminated, etc.) or may be remapped or otherwise modified (e.g., to map the virtual addresses to a different part of the physical address space). When one core of a processor invalidates mappings in its own address translation cache, the core may also send a message (referred to herein as a translation invalidation message) to direct other cores to likewise invalidate corresponding mappings in their own address translation caches. The translation invalidation tasks required by such messages may use significant time and resources to perform, and may therefore be relatively costly in terms of processor performance. Methods and systems described herein therefore relate to ways that a context table can be used to quickly and efficiently filter (e.g., nullify, skip, cancel immediately discharge or complete, etc.) certain translation invalidation messages to thereby significantly improve processor performance with respect to translation invalidation procedures.

In some aspects, the techniques described herein relate to a method including: identifying a context to which a message corresponds, the message being a translation invalidation message received by a first core of a processor from a second core of the processor; determining, based on the context to which the message corresponds and a context table configured to store contexts in which the first core has operated, that an address translation cache of the first core lacks any entry targeted by the message; and based on the determining that the address translation cache lacks any entry targeted by the message, discharging the message without accessing the address translation cache.

In some aspects, the techniques described herein relate to a first core of a processor, the first core including: an address translation cache; a context table configured to store contexts in which the first core has operated; and a translation invalidation controller configured to: identify a context to which a message corresponds, the message being a translation invalidation message received by the first core from a second core of the processor; determine, based on the context to which the message corresponds and the context table, that the address translation cache lacks any entry targeted by the message; and based on the determining that the address translation cache lacks any entry targeted by the message, discharge the message without accessing the address translation cache.

In some aspects, the techniques described herein relate to a processor including: a first core including an address translation cache and a context table configured to store contexts in which the first core has operated; and a second core configured to dispatch a message to the first core, the message being a translation invalidation message; wherein, upon receiving the message from the second core, the first core is configured to: identify a context to which the message corresponds, determine, based on the context to which the message corresponds and the context table, that the address translation cache lacks any entry targeted by the message, and based on the determining that the address translation cache lacks any entry targeted by the message, discharge the message without accessing the address translation cache.

Other implementations may perform similar functions as described above and/or may use other types of hardware to perform the functions. Certain implementations may involve systems, devices, media, and/or combinations of these, that employ processors such as described herein (e.g., with cores, caches, and/or buses configured to achieve translation invalidation filtering based on a context table within a processor core in the ways described herein).

The details of these and other implementations are set forth in the accompanying drawings and the description below. Other features will also be made apparent from the following description, drawings, and claims.

DETAILED DESCRIPTION

Figure 1:
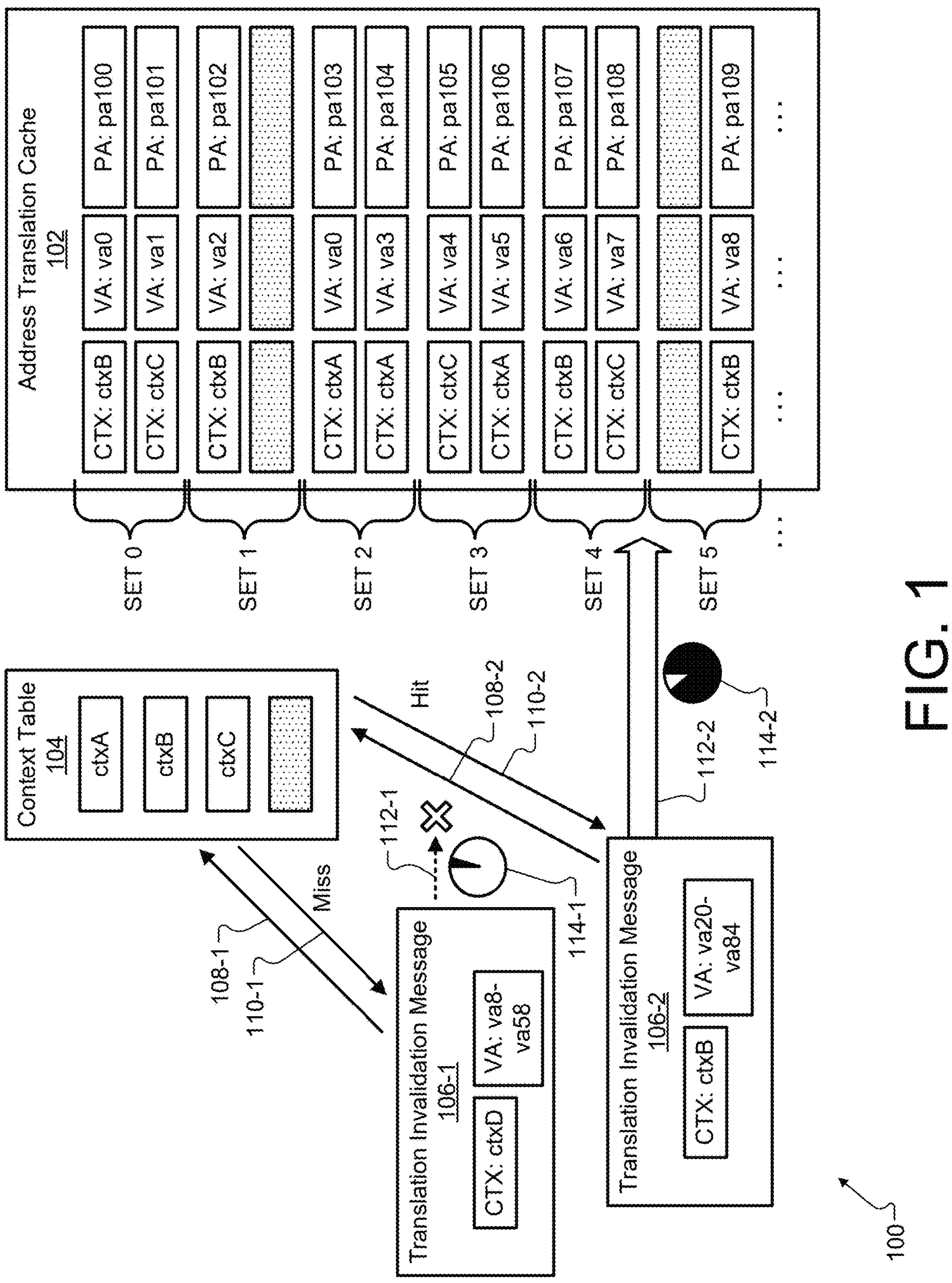
FIG. 1 shows an illustrative implementation of translation invalidation filtering based on a context table within a processor core in accordance with principles described herein.

Methods and systems for translation invalidation filtering based on a context table within a core of a processor are described herein. As detailed below, translation invalidation messages may be exchanged between cores of a multi-core processor to maintain coherency of localized address translation caches (e.g., translation lookaside buffers) managed by each of the cores. While some translation invalidation messages received by a given core could be pertinent to what the core has been working on (e.g., such that the address translation cache of the core would indeed have entries that are to be invalidated in response to the particular translation invalidation messages), it is often the case that the address mappings designated for invalidation by a particular message are not relevant to the core (e.g., since they do not relate to parts of the address space the core has been working in). Accordingly, implementations described herein relate to methods and systems for using context tables to filter translation invalidation massages that are irrelevant to a particular core. Using techniques described herein, for example, proper translation invalidation may be performed when appropriate but without the inefficiency of also performing many translation invalidation tasks that turn out to be redundant, ineffectual, or that otherwise consume processor resources without producing a useful effect.

A processor (e.g., a central processing unit (CPU), a graphics processing unit (GPU), a microcontroller, etc.) may include a plurality of cores (also referred to herein as processor cores) that operate in parallel and intercommunicate with one another to reconcile actions that each may be taking that could affect operations being performed by the others. For example, each core may access shared resources such as main memory (e.g., a bank of dynamic random-access memory), auxiliary processing resources (e.g., a graphics processing unit), peripheral input/output devices (e.g., a hard drive controller, a universal serial bus (USB) controller, etc.), and so forth, and the cores may intercommunicate to coordinate their use of these resources. In this way, the cores can avoid conflicts such as, for instance, two cores writing different values to the same memory address at the same time, one core reading a stale version of data that another core has locally modified, or the like.

Proper coordination between cores that are otherwise operating semi-independently (e.g., each executing instructions to run different software instances that have been assigned to them) may be achieved by a variety of techniques, one of which is virtual addressing. Each of the computing resources mentioned above (and other resources accessible to the cores) may be communicated with using physical addresses. For example, within an address space, certain physical addresses may be assigned to main memory, other physical addresses (different from those assigned to main memory) may be assigned to a first memory-mapped device (e.g., a USB controller), still other physical addresses may be assigned to another memory-mapped device (e.g., a network controller), and so forth. Each software instance may also be stored and given memory space within one or more allocated data blocks of main memory that may be dynamically assigned (e.g., by an operating system) at runtime based on various conditions and circumstances (e.g., what other software and data is currently stored in the memory, etc.).

Thus, while physical addresses are used to perform memory transactions (e.g., loads, stores, etc.) and to control memory-mapped devices (e.g., reading and writing control registers, etc.), it is generally not practical or possible for a complex (e.g., multi-core) processor to hardcode physical memory addresses for these shared resources into the software. Rather, software generally uses virtual addresses that are translated to physical addresses when being used for purposes that are external to the local concerns of the core (e.g., when being sent to a shared cache that will have more direct communication with memory and devices). This allows flexibility for an operating system to dynamically assign and reassign (e.g., map and remap, etc.) the virtual and physical addresses at runtime in ways that would be unforeseeable prior to runtime.

Various virtual address translation techniques may be employed by modern processors to address challenges relating to virtual address translation. For example, each core may maintain a local address translation cache that is configured to keep track of mappings between various virtual addresses relevant to a particular context (e.g., a software instance being executed) and physical addresses to which those virtual addresses correspond. One example of such a cache is referred to as a translation lookaside buffer (TLB). A given core may include one or more such TLBs that are configured with different characteristics that aim to achieve different objectives. For instance, certain TLBs could be configured to store address mappings for program instructions stored in memory (instruction TLBs), while other TLBs could be configured to store address mappings for other types of data stored in memory and/or memory mapped devices (data TLBs). Additionally, certain TLBs (e.g., level 1 or L1 TLBs) could be configured to be quite small and fast so as to provide a few very recently or frequently used mappings to the core very quickly, while other TLBs (e.g., level 2 or L2 TLBs) could be configured with have significantly more capacity (to store more mappings, including for certain addresses that have not necessarily been used as recently or frequently), with the tradeoff that these will tend to have more latency than the smaller TLBs.

Regardless of the data type, capacity, latency, or other characteristics of a given TLB, all of these types of TLBs will broadly be referred to herein as address translation caches or translation lookaside buffers. It will be understood that these address translation caches are distinct from other caches described herein that are used to store data from memory and devices (rather than address translation mappings such as the TLBs described above). For example, local level 1 (L1) caches described herein may be used by cores to store local copies of frequently used memory entries, shared level 2 (L2) caches may communicate with all the cores to manage access to main memory and memory-mapped devices, and so forth. While a shared TLB (accessible to several or all of the cores of the processor) might be employed in certain implementations, it will be understood that latency requirements for address translation are generally stringent enough that each core maintains its own local TLBs (which can be accessed very quickly, such as within one or a few clock cycles) that the core keeps updated and reconciled with the others in ways described herein.

As mentioned above, the mappings of virtual addresses to physical addresses stored in an address translation cache such as a TLB may be dynamic and subject to change from time to time. For example, one or more blocks of addresses (referred to as pages) could be remapped (or otherwise overwritten or modified) when a new software instance is being initialized, and the operating system has to move software instances and/or other data around in memory to make room for the new one. Similarly, when a software instance is closed or otherwise completes its execution run, the memory pages previously used by that instance may be released so that they can be used by other software instances. In any case, when one core makes updates to its own local TLB (e.g., to deallocate, move, or otherwise invalidate previous address mappings), system coherence may require that the updates be communicated to the other cores so that they also update their mappings and caches as appropriate, and the desired changes can be implemented universally throughout the processor. Whether one or more pages of memory are being released (e.g., deallocated) or remapped or otherwise altered, the first step of these types of operations would generally involve the core of the processor that is altering the one or more memory pages in its local TLB to broadcast a translation invalidation message to the other cores of the processor. The core sending such a message will be referred to herein as a "source core," while the other cores that receive the message will be referred to herein as "receiving cores." While one core may play the role of the source core while the others play the role of the receiving cores for a given translation invalidation transaction, it will be understood that, for other such transactions, each core may be configured to play the role either of the sending core or the receiving core as may be called for by a given transaction.

As used herein, translation invalidation messages refer to messages shared between cores of a processor (e.g., directly or by way of a multi-access (shared) data cache such as described below) to invalidate entries of local address translation caches or buffers (e.g., TLBs) maintained by each core. For instance, one example of a translation invalidation message may be a TLB invalidation (TLBI) message. Such TLBI messages (or TLBIs, for short) may refer to blocks of memory (i.e., address ranges) containing several pages. For example, if 70 pages of the source core's TLB are to be remapped, a TLBI may be broadcast that covers those 70 pages. Alternatively, a burst of 70 one-page TLBIs could be broadcast to all the cores of the processor to invalidate any entries that any of the cores may have in their TLBs for those specific pages.

One technical problem associated with translation invalidation message processing on a receiving core relates to the amount of work and time required to perform translation invalidation tasks called for by the message. For example, if a translation invalidation message (e.g., a TLBI) indicates a large range of addresses whose mappings are to be invalidated, a set-associative or direct-mapped address translation cache may have no efficient way of searching its own contents (e.g., one or more entries in each of a plurality of sets maintained by the cache, as will be described in more detail below) to determine if there are entries within the address translation cache that are to be invalidated in response to the message (i.e., if there are actually translation invalidation tasks that need to be done before discharging the message). For instance, an address translation cache implemented by an L1 data TLB (an LIDTLB) will be considered as a particular example. The LIDTLB may be a set-associative cache having N sets with M entries each (e.g., N sets associated with M ways). For example, N could be 16, 32, 64, 100, 256, or another suitable number of sets implemented in a particular LIDTLB cache, while M could represent 2, 4, 8, 12, 16, or another suitable number of ways in this set-associative cache (similar principles would also apply for a direct-mapped cache with M=1).

For a typical set-associative cache such as an LIDTLB, the cache may be accessed to read a single set at a time. For example, when addressed with the index of a particular one of the N sets, the cache would produce the M entries associated with that set in a single clock cycle so that the entries would be evaluated. As a result, in this example, at least N cycles may be required for a translation invalidation controller to scan each of the N sets of the address translation cache to determine if there are mappings stored in that set that are to be invalidated in response to a particular translation invalidation message (assuming that the message designates a range of addresses, rather than a single address that would index to a specific set). For certain address translation caches (e.g., a larger L2 TLB that has a larger capacity and higher latency than the LIDTLB in this example), the access latency of the cache could be longer than one clock cycle and this overall time to scan the N sets would hence be even longer (e.g., 2N cycles if each set takes two clock cycles to read, 3N cycles if each set takes three clock cycles to read, etc.).

The technical problem associated with performing translation invalidation tasks called for by a translation invalidation message is thus not only that the tasks may take many cycles to perform (which itself may hurt processor performance), but further that the address translation cache is tied up for that long period of time when it might otherwise be used to further other tasks that require cached address translation information. For example, while the LIDTLB is occupied for N cycles to scan whether there are relevant entries for a particular TLBI, other instructions (e.g., memory transactions) that require the LIDTLB (e.g., load transactions, store transactions, etc.) are put on hold as they await their turn to access the LIDTLB.

All of these types of delays will be costly to the performance of the processor, but such costs may be acceptable (and are to be expected) on occasions when there are pertinent entries within the address translation cache that really do need to be invalidated in response to a given translation invalidation message. The delay becomes a significant technical problem, however, when no relevant entry to be invalidated is ultimately found within the cache (even after the N cycles of searching) and it becomes clear that the delays were for nothing (i.e., not actually necessary for proper functionality of the processor). This wasteful scenario may even be the more common situation in many cases. Generally, if software is well written, translation invalidation messages that may be cause for certain virtual-to-physical mappings to be invalidated within an address translation cache would mostly relate to pages of memory that are relatively unlikely to be represented in an address translation cache of another core, particularly a small cache such as an LIDTLB. For example, a core may largely be operating in one part of the memory address space and translation invalidation messages (e.g., TLBIs) that it receives from other cores may be likely to relate to other parts of the memory address space that are functionally irrelevant to the receiving core (e.g., because they are relevant to a sending core that is operating in a different context).

In these common scenarios, it is not trivial to determine for certain whether there are relevant addresses (i.e., addresses designated by the translation invalidation messages) referenced within the address translation cache. Accordingly, as described above, a delay of N or more clock cycles (where N is the number of sets of the address translation cache) has conventionally been required to scan the address translation cache to determine whether or not there even exists a relevant entry in the cache that will require invalidation. The technical problem described above thus relates to significant system slowdowns that result from additional delay and effort being expended when such is often not necessary and does not provide any benefit to the system (because it turns out that there is no relevant entry after all the sets have been systematically searched).

Methods and systems (e.g., processors, cores, controllers, other hardware circuitry, etc.) described herein for translation invalidation filtering based on a context table within a processor core provide beneficial technical solutions to the technical problems that have been described. In particular, at least one technical solution described herein provides significant efficiency gains by maintaining the current context in which the core is operating in a current context register, as well as maintaining a context table that stores contexts in which the core has operated (e.g., the current context and other previous contexts in which the core operated prior to the current context). For example, the context table may be implemented by a storage structure such as another small and low latency cache that is configured to store identifiers for each context that is represented within one or more address translation caches of the core.

Using a context table in accordance with principles described herein, much quicker (lower latency) determinations may be made as to what work a particular translation invalidation message will entail. For example, a quick access (e.g., one cycle or a small number of cycles) to the context table may instantly indicate to a controller whether: 1) there is no chance that the translation invalidation message will be effectual (since the message relates to a context that is not represented in the context table and, by extension, not represented in the address translation cache), or, alternatively, 2) whether there is at least a chance that the translation invalidation message may be relevant, such that translation invalidation tasks need to be assigned based on the message in the conventional way. In other words, the context table may provide, with extremely low latency (e.g., as quickly as within a single clock cycle), information indicating either: 1) the particular translation invalidation message may be filtered (e.g., ignored, immediately dispensed with, discharged without searching or accessing the address translation cache, etc.), or 2) that the particular translation invalidation message may not be filtered (i.e., it is to be performed in the conventional way or another suitable way).

It will be understood that even if a quick access to the context table cannot indicate for sure whether a translation invalidation message may be filtered when the translation invalidation message happens to relate to a relevant context (i.e., a context in which the core is currently operating or has recently operated), readily accessible information from the context table can indicate for sure that a translation invalidation message is safe to filter when the translation invalidation message relates to a context that is completely orthogonal to anything the core is working on or has worked on (i.e., a context not found in the context table). Since, as mentioned above, this latter scenario may typically be the more common scenario, significant efficiency may be gained by using a context table to filter many translation invalidation messages and only performing those that pass the bar of relating to a relevant context. It will be understood that certain translation invalidation messages that remain unfiltered by techniques described herein may still turn out to be irrelevant to the work of a particular core (since the address range of the translation invalidation message may be of a relevant context while still being orthogonal to any address stored for that context in the address translation cache). However, since a large number of translation invalidation messages may tend to relate to contexts that a given core has not operated within (especially with well-written software), technical effects of fewer wasted cycles, less unnecessary processing, and corresponding improvements in processor performance may all result from implementation of the methods and systems described herein.

Along with increases in efficiency and improved processor performance (e.g., lower latency, more instructions processed per second, lower power consumption, etc.) described above, other beneficial technical effects may also arise from methods and systems described herein for translation invalidation filtering based on context tables. As one example, the current context register may be maintained to allow regular memory transactions (e.g., loads and stores) that may be ongoing concurrently with a requested translation invalidation task to continue accessing the address translation cache without interference as translation invalidation messages are processed by first accessing the context table. For the common scenario in which the context table returns a miss (i.e., indicates that the context of interest is not to be found in either the context table or, by extension, the address translation cache), the input ports of the address translation cache never need to be tied up for even one clock cycle to process the translation invalidation message. This may be highly beneficial to other ongoing transactions, leading, for example, to the technical effect that most translation invalidation messages can be satisfied without interfering with or causing any delays for memory operations that may be ongoing.

In other words, in an example with an LIDTLB address translation cache and a TLBI translation invalidation message, the controller implementing the TLBI (referred to herein as a translation invalidation controller) may perform a lookup in the context table before the LIDTLB is scanned or accessed at all. If the context indicated in the TLBI is not in the context table, the TLBI would be completed (discharged, etc.) without ever having to scan the various sets of the LIDTLB. Otherwise, the TLBI would not be able to complete until all the LIDTLB sets are scanned. Thus, with this approach, the TLBI can be immediately discharged after the quick lookup to the context table, and no additional cycles would be needed for scanning all the LIDTLB sets (since it would be known that the context of the TLBI does not exist in the address translation cache, just as it is not found in the context table).

Moreover, the lookup ports of the LIDTLB would not ever need to be occupied on account of the TLBI as long as there is no match in the context table (i.e., the context table returns a hit for the context of interest, rather than a miss). Memory operations such as load and store instructions (also referred to as microoperations or understood to comprise one or more microoperations) that are executed between two context switch events would all use the same context (i.e., the current context). Since these operations may use the context identifier stored in the current context register, they do not need to look anything up in the context table and thus would not interfere with lookup being performed on behalf of the TLBI. Likewise, as mentioned above, while the context table is being accessed for the TLBI, other load and store instructions can freely access the LIDTLB (i.e., without interference from TLBI operations), since the current context register would nullify any need to look up the context table before accessing the LIDTLB.

Various implementations will now be described in more detail with reference to the figures. It will be understood that particular implementations described below are provided as non-limiting examples and may be applied in various situations. Additionally, it will be understood that other implementations not explicitly described herein may also fall within the scope of the claims set forth below. Translation invalidation filtering based on a context table within a processor core in accordance with principles described herein may result in any or all of the technical effects mentioned above, as well as various additional and/or alternative beneficial technical effects described and/or made apparent below.

FIG. 1 shows an illustrative implementation 100 of translation invalidation filtering based on a context table within a processor core in accordance with principles described herein. As shown, implementation 100 shows certain elements that will be understood to be included within a particular processor core (illustrated and described in more detail below). For example, these elements are shown to include an address translation cache 102 and a context table 104. While not explicitly shown in this figure, a translation invalidation controller is configured to access these elements in furtherance of carrying out tasks associated with various translation invalidation messages including a first translation invalidation message 106-1 and a second translation invalidation message 106-2. Each of the elements of implementation 100 will now be described in more detail to illustrate how certain translation invalidation messages (e.g., translation invalidation message 106-1 in this example) may be filtered (i.e., discharged without the translation invalidation controller accessing address translation cache 102 as part of its handling of the message), while other translation invalidation messages (e.g., translation invalidation message 106-2 in this example) may not be filtered (and may thus be performed in a conventional manner that includes accessing address translation cache 102).

Address translation cache 102 is shown to be a set-associative cache featuring a plurality of sets and a plurality of ways (i.e., multiple entries per set). Specifically, as shown, six sets of two entries each are shown in implementation 100 by entries including multiple fields on a particular row and two entries bracketed by each of a plurality of sets 0 to 5 ("Set 0" to "Set 5"). Ellipses under the entries of Set 5 will be understood to represent additional sets that may be included in the cache, such that the cache could include any suitable number of sets such as 8 sets, 16 sets, 25 sets, 32 sets, 64 sets, 100 sets, 128 sets, 256 sets, or the like. As a two-way set-associative cache, address translation cache 102 is shown to include two entries (one per way) associated with each set.

Each entry of address translation cache 102 (represented by the various rows of the cache) is shown to store a context ("CTX") and a mapping from a virtual address ("VA") to a physical address ("PA"). The context will be understood to store a particular context identifier indicating a particular process, thread, or other software instance that uses a particular virtual address space (set of virtual addresses). The mapping of the entry then shows the physical address that is to be accessed when the virtual address for this context is referred to. Contexts, virtual addresses, and physical addresses will be described in more detail below.

As shown in each entry, the field identifier within the entry (CTX, VA, or PA) is indicated with capital letters and a colon (': '), followed by a value for that field that is indicated with corresponding lowercase letters (i.e., "ctx", "va", and "pa") and generic identifiers (i.e., 'B', '0', and '100' in the example of the top entry of SET 0). This notation is used to represent a wide array of possible data formats, bit widths, address space sizes, and so forth, while still illustrating certain similarities between certain values stored in the cache. For example, the physical addresses are shown to each be unique values within the universal physical address space ("pa100" to "pa109"). The virtual address are similarly unique, though in one example a same virtual address (va0) is shown to be used in relation to different contexts (i.e., used with context ctxB in the first entry of SET 0 and used with context ctxA in the first entry of SET 2). Other than this overlap, the virtual addresses are also identified generically by values (va0 to va8) within the respective virtual address spaces of the three contexts (ctxA, ctxB, and ctxC) that happen to be represented within address translation cache 102 at this time.

Certain entries are shown to be unused (shaded lightly instead of populated with CTX, VA, and PA values). These entries of the cache will be understood to be available (open) and may be used if another mapping that indexes to the respective sets having the open entries (i.e., SET 1 and SET 5 in this example) is to be cached.

While various additional entries associated with sets beyond SET 5 may be included (represented by the ellipses, as described above), this example assumes that all of the entries are associated with one of three contexts: ctxA, ctxB, or ctxC. For example, the core hosting this particular address translation cache 102 may have been assigned to work on three different software instances (e.g., processes) that are associated with these three different contexts. Between operating in each different context, the core may have undergone a context switch event such as will be described in more detail below.

Given that only these three contexts are represented within address translation cache 102, context table 104 is shown to include four entries that store these three context identifiers (ctxA, ctxB, and ctxC) and leave an open or available entry for storing a fourth context if a context switch event to transition to such a context (other than ctxA, ctxB, or ctxC) were to occur. While a four-entry context table 104 is shown in implementation 100, it will be understood that other implementations could include context tables of other suitable sizes (e.g., 2 entries, 6 entries, 8 entries, 12 entries, 16 entries, 32 entries, etc.), depending on how many contexts a typical core may be expected to operate in for a given implementation.

Having described address translation cache 102 and context table 104, the processing of two translation invalidation messages 106-1 and 106-2 using address translation cache 102 and context table 104 will now be described. As mentioned above, this processing may be performed within a core of a processor by, for example, a translation invalidation controller or other suitable logic or operational unit that is configured to receive translation invalidation messages from other cores and to see that any operations called for by the translation invalidation messages (referred to herein as translation invalidation tasks) are properly carried out. Each of the translation invalidation messages 106-1 and 106-2 are shown to be processed by, first, accessing context table 104 (represented by an arrow 108-1 for translation invalidation message 106-1 and by an arrow 108-2 for translation invalidation message 106-2). Based on the response from context table 104 (e.g., a context table "Miss" represented by an arrow 110-1 for translation invalidation message 106-1 and a context table "Hit" represented by an arrow 110-2 for translation invalidation message 106-2), the next action performed based on the messages (represented by an arrow 112-1 for translation invalidation message 106-1 and by an arrow 112-2 for translation invalidation message 106-2) is shown to be very different in nature, as well as to take a very different amount of processing time and effort (represented by a time symbol 114-1 for translation invalidation message 106-1 and by a time symbol 114-2 for translation invalidation message 106-2).

More specifically, as shown, translation invalidation message 106-1 is a message indicating that any entry within address translation cache 102 that corresponds to context ctxD (CTX: ctxD) and a range of virtual addresses from va8-va58 (VA: va8-va58) is to be invalidated. One way that the controller could go about carrying out this translation invalidation message is to determine, for all 50 virtual addresses in the range indicated by the message, which sets the virtual addresses map to so that these sets could each be checked (possibly leaving others unchecked if no address in the range would index to those sets). This determination may be a significant undertaking, however, and may produce little fruit if most or all of the sets in the relatively small address translation cache 102 are indexed by at least one address in the range. Conversely, another approach would be for the controller to dispense with trying to determine which sets must be searched, and to just search all of them instead. For example, SET 0 may be read out to determine if it holds any addresses from context ctxD and virtual address range va8-va58, followed by SET 1 being read out and similarly analyzed, SET 2 being read out and analyzed, and so forth. In this scenario, as described above, at least N clock cycles may be consumed to check the entire address translation cache 102 against translation invalidation message 106-1 (where N is the total number of sets included in address translation cache 102 and assuming that it takes only one clock cycle per set to check for a match).

Instead of proceeding in these conventional manners, however, implementation 100 shows how translation invalidation message 106-1 may be carried out using context table 104 and principles of translation invalidation filtering described herein. Specifically, as shown by arrow 108-1, context table 104 may be accessed to determine if it includes the context identifier ctxD, since that is the context with which translation invalidation message 106-1 corresponds. Arrow 110-1 indicates that context table 104 returns a miss. That is, as shown by the identifiers in the entries of context table 104 (ctxA, ctxB, and ctxC), the receiving core is not operating in context ctxD currently, nor has it apparently worked in that context recently or ever, since the absence of ctxD in context table 104 indicates that there is no context ctxD entry in address translation cache 102. Based on the context table miss received at arrow 110-1, translation invalidation message 106-1 may be immediately discharged (e.g., completed) without accessing address translation cache 102. To illustrate, arrow 112-1 is shown to encounter an 'X' symbol (indicating that no further actions need be performed to complete translation invalidation message 106-1) rather than proceeding to address translation cache 102 (which would indicate an access to the address translation cache 102, as described below). Advantageously, this message is discharged very quickly and efficiently, since no further action is required after the miss is received from context table 104. Time symbol 114-1 illustrates this relatively short time with a darkened part of the clock showing just a relatively small sliver of time associated with carrying out translation invalidation message 106-1.

Translation invalidation message 106-2 is a message indicating that any entry within address translation cache 102 that corresponds to context ctxB (CTX: ctxB) and a range of virtual addresses from va20-va84 (VA: va20-va84) is to be invalidated. Even though, as far as is illustrated in FIG. 1 (above the ellipses), these virtual addresses are not represented within address translation cache 102, it is not trivial with an address range spanning 64 virtual address such as this, to know whether any relevant entry is included within address translation cache 102. Accordingly, similarly as described above for translation invalidation message 106-1, context table 104 may be accessed to see if it might be possible to immediately dispense with translation invalidation message 106-1 (just as translation invalidation message 106-1 was discharged at arrow 112-1). In this case, however, implementation 100 shows that translation invalidation message 106-2 is not ultimately filtered like translation invalidation message 106-1 was. Rather, as represented by arrow 112-2, translation invalidation message 106-2 may be processed in a more conventional way, such as by accessing (reading out) and analyzing each set of the address translation cache 102 one at a time to search for virtual addresses in ctxB and within the indicated range from va20-va84.

This difference in outcome (i.e., the difference between arrow 112-1 and arrow 112-2) is because, when context table 104 is accessed at arrow 108-2 to determine if it includes the context identifier ctxB, context table 104 this time returns a hit, as indicated by arrow 110-2. That is, the context table 104 indicates that context ctxB is indeed to be found in the entries of the table since the receiving core is now operating within, or has recently operated within, context ctxB. This hit reveals that there is at least one context ctxB entry in address translation cache 102. Thus, even if there is no guarantee that an entry within the relevant virtual address range will also be found, a more conventional mode of thoroughly searching address translation cache 102 may be required before discharging translation invalidation message 106-2 (e.g., by performing one or more translation invalidation tasks that involve accessing address translation cache 102). It takes significantly more time and work to discharge this latter translation invalidation message 106-2, since a thorough scan of address translation cache 102 has to be carried out to determine whether the message is relevant and whether there are entries that are to be invalidated. Time symbol 114-2 illustrates this relatively long time with a darkened part of the clock showing a much more substantial portion of the clock than the small sliver of time associated with carrying out translation invalidation message 106-1. While the same benefits are not enjoyed for translation invalidation message 106-2 as were described for translation invalidation message 106-1, it will be understood that the scenario of translation invalidation message 106-1 may be more common (especially with well-written software), and the proper handling of translation invalidation message 106-2 when there is a chance of the message being pertinent is what allows for the benefits of discharging translation invalidation message 106-1 and the performance increase associated therewith.

Figure 2:
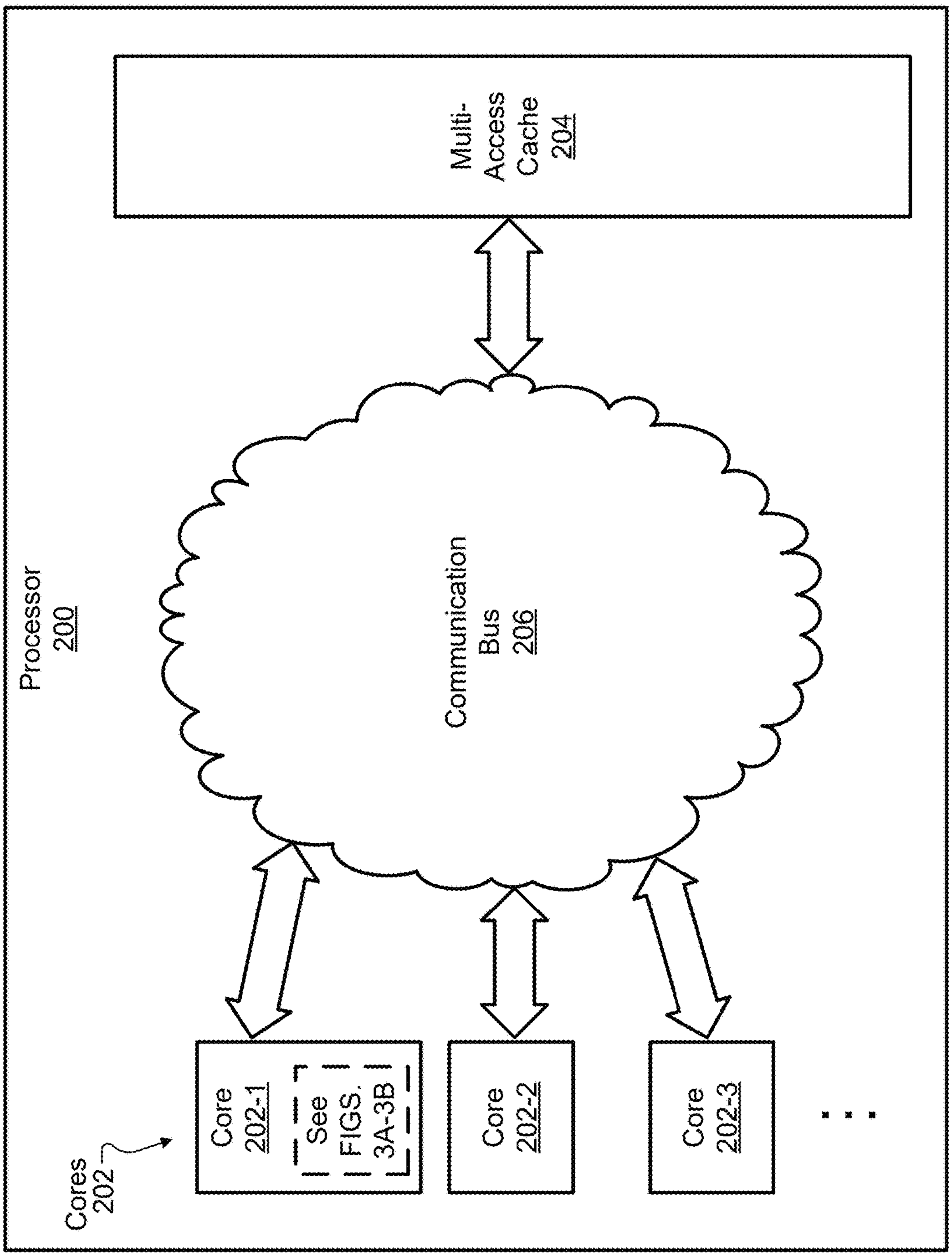
FIG. 2 shows illustrative aspects of an example multi-core processor that is configured to implement translation invalidation filtering based on a context table in accordance with principles described herein.

FIG. 2 shows illustrative aspects of an example processor 200 that is configured to implement translation invalidation filtering based on a context table in accordance with principles described herein. For example, processor 200 may be implemented as a multi-core central processing unit (CPU) or, in certain examples, another type of processor such as a graphics processing unit (GPU), a microprocessor, or the like. Processor 200 is shown to include a first core 202-1 and a plurality of other cores 202-2, 202-3, and so forth (additional cores represented in the figure by an ellipsis). For example, some example implementations could include two cores, four cores, eight cores, twelve cores, sixteen cores, thirty-two cores or any other number of cores as may serve a particular implementation. For examples described herein, the first core 202-1 will be understood to be the receiving core that is receiving translation invalidation messages (e.g., the core referred to in the description of implementation 100), while the other cores 202-2, 202-3, and so forth, may serve as source cores that broadcast these and other messages. While these particular roles will be emphasized in the examples described herein, it will be understood each core 202-1, 202-2, and 202-3 of processor 200 may be configured to serve both as a source core with respect to some messages, and as a receiving core with respect to other messages.

Along with the processing cores (i.e., cores 202-1, 202-2, 202-3, etc.), processor 200 is also shown to include a multi-access cache 204 configured to serve the plurality of cores of processor 200 (i.e., cores 202-1, 202-2, 202-3, etc.), and a communication bus 206 communicatively coupling multi-access cache 204 to each of the cores 202-1, 202-2, 202-3, and so forth. For example, multi-access cache 204 may represent a level 2 (L2) data cache that is communicatively coupled to a memory controller (not shown in FIG. 2) and configured to cache certain data (e.g., to temporarily stage frequently-accessed data for low-latency access by the cores on the data's way to or from main memory and/or a variety of memory-mapped devices). In this way, multi-access cache 204 may perform or facilitate memory transactions (e.g., load transactions whereby data is obtained from memory or a device, store transactions whereby data is sent to memory or a device, etc.) requested by any of the cores of processor 200. It will be understood that multi-access cache 204 is a data cache, which is a different type of cache from the address translation caches (e.g., TLBs) described herein and illustrated to be included in each core (see FIGS. 3A-3B below).

Communication bus 206 may be configured to carry data transmissions (e.g., messages such as translation invalidation messages, memory transaction messages, synchronization messages, acknowledgements, and other types of messages) from the cores to multi-access cache 204, from multi-access cache 204 to any or all of the cores, from one core to another core, and/or between these and/or other components of processor 200 not explicitly shown. For example, communication bus 206 may include a variety of transmission nodes (not explicitly shown in FIG. 2) arranged and interconnected in any suitable way. For example, transmission nodes may be connected in any suitable topology such as a point-to-point topology, a mesh topology, a ring topology, a star topology, a tree topology, a hybrid topology incorporating elements of two or more of these, or the like. In this way, each of the cores 202-1, 202-2, 202-3, etc., may be connected to multi-access cache 204, as well as to one another (and, possibly, to other elements of processor 200 not explicitly shown).

Any of the cores shown in the implementation of processor 200 may be configured to perform any of the methods, processes, and/or techniques described herein. For example, first core 202-1 may include an address translation cache (e.g., address translation cache 102) and a context table (e.g., context table 104) configured to store contexts in which first core 202-1 has operated. Second core 202-1 may then be configured to dispatch a message (e.g., translation invalidation message 106-1) to first core 202-1. Upon receiving this message from second core 202-2, first core 202-1 may be configured to: 1) identify a context to which the message corresponds; 2) determine, based on the context to which the message corresponds and the context table, that the address translation cache lacks any entry targeted by the message; and 3) based on the determining that the address translation cache lacks any entry targeted by the message, discharge the message without accessing the address translation cache.

The broadcasting and receiving of messages, such as translation invalidation messages described in examples herein, may be performed directly via communication bus 206 in certain implementations (e.g., a first message sent directly from core 202-1 to core 202-2, a second message sent directly from core 202-1 to core 202-3, etc.). In other implementations, however, these types of communications (e.g., broadcast communications from one core to all the others) may be performed using multi-access cache 204, which is already configured to help manage and coordinate all the cores in various ways. For example, the broadcasting of a translation invalidation message from core 202-2 to core 202-1 and other cores (e.g., core 202-3, etc.) may include, in one example: 1) sending, by way of communication bus 206, the translation invalidation message from second core 202-2 to multi-access cache 204, and 2) sending, by way of communication bus 206, the translation invalidation message from multi-access cache 204 to first core 202-1 and the plurality of other cores (e.g., third core 202-3 and the other cores not explicitly shown in FIG. 2).

Figure 3A:
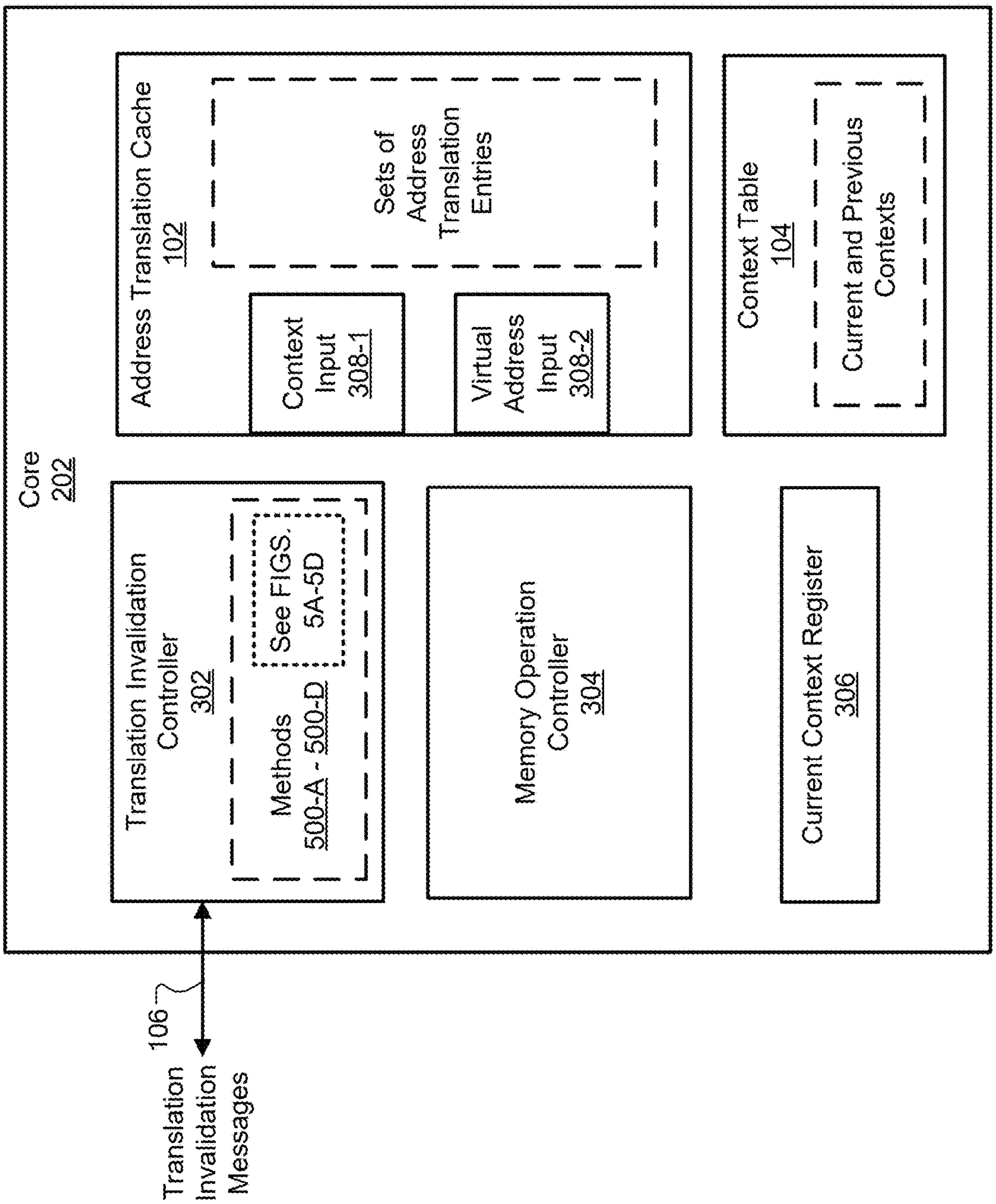
FIGS. 3A-3B show illustrative aspects of an example core of a processor that is configured to implement translation invalidation filtering based on a context table in accordance with principles described herein.
Figure 3B:
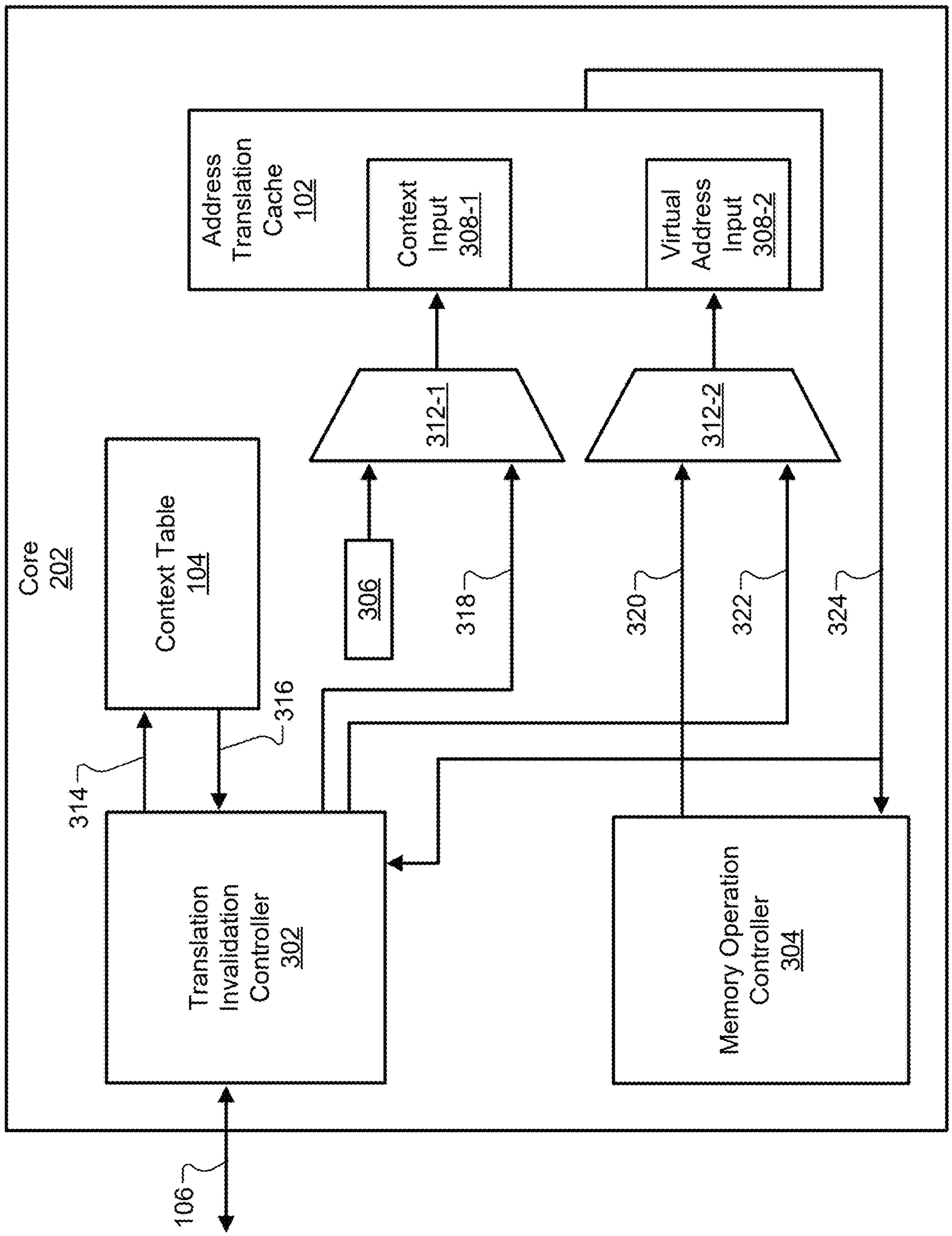

FIGS. 3A-3B show illustrative aspects of an example core 202 of a processor that is configured to implement translation invalidation filtering based on a context table in accordance with principles described herein. For example, core 202 may represent core 202-1 described above (the receiving core in the example translation invalidation transaction described) or any of the other cores of a processor such as processor 200 or another processor described herein. Whereas FIG. 3A shows a block diagram featuring certain example elements of core 202, FIG. 3B shows additional details regarding how certain of these elements may be interconnected so as to facilitate methods and techniques described herein.

Referring specifically to FIG. 3A, core 202 is shown to include an implementation of address translation cache 102 (including the sets of address translation entries described in more detail above with reference to FIG. 1), an implementation of context table 104 (configured to store current and previous contexts in which the first core is operating and has operated), and a translation invalidation controller 302. Translation invalidation controller 302 may receive translation invalidation messages 106 such as either of the translation invalidation messages 106-1 or 106-2 described above, or other translation invalidation messages described herein. Based on such messages, translation invalidation controller 302 may be configured to perform various procedures and techniques described herein for translation invalidation filtering based on a context table. For example, translation invalidation controller 302 may be configured to: 1) identify a context to which a message corresponds, the message being one of translation invalidation messages 106 received by the core 202 from another core of the processor; 2) determine, based on the context to which the message corresponds and the context table 104, that the address translation cache 102 lacks any entry targeted by the message; and 3) based on the determining that the address translation cache lacks any entry targeted by the message, discharge the message without accessing the address translation cache. This method is further illustrated and described below with reference to method 500-A in FIG. 5A. Additionally, as shown by a dashed-line tag within translation invalidation controller 302 in FIG. 3A, various methods 500-A to 500-D described below with reference to FIGS.

5A-5D will be understood to be performed by a translation invalidation controller such as translation invalidation controller 302 within core 202.

Along with the implementations of address translation cache 102 and context table 104, core 202 is also shown to include a memory operation controller 304 and a current context register 306.

Just as translation invalidation controller 302 may be configured to receive translation invalidation messages 106 and perform various operations and tasks to carry out these messages, memory operation controller 304 may be configured to receive and carry out memory operations that may be assigned by a particular execution unit within the core such as a load/store unit (LSU) configured to execute load instructions, store instructions, and/or other memory transactions as core 202 may be tasked with. The various operations performed to carry out these memory transactions may be referred to as memory operations and may include one or more microoperations that, like translation invalidation tasks performed by translation invalidation controller 302, may make use of address translation cache 102.

Current context register 306 is a storage element that can be implemented in various ways (e.g., by a flip-flop, a register, a latch, an entry within a static random-access memory (SRAM), etc.) in the core 202. Current context register 306 may be configured to store a context identifier that represents the context in which the core is currently operating. Load and store instructions, among other operations, may use the context identifier stored in this register to look up address mappings in the address translation cache 102. Because these operations use the context identifier stored in current context register 306, they would not need to access the context table 104, and thus do not interfere with lookups being performed on behalf of other operations.

As described above, address translation cache 102 may maintain mappings between virtual addresses and physical addresses for various contexts in which the core operates. As illustrated, address translation cache 102 may be implemented as a set-associative cache, in which entries are indexed with respect to a plurality of sets, each set being configured to store a plurality of entries. For example, address translation cache 102 could be implemented as a 4-way, 64-set associative LIDTLB, or another such structure. In some examples, the address translation cache may be implemented as a first translation lookaside buffer. Additionally, along with the address translation cache, the first core could further include a second translation lookaside buffer (not shown in FIG. 3A). For example, the second translation lookaside buffer may be an L2 translation lookaside buffer having a greater capacity and slower response time than the first translation lookaside buffer. As mentioned above, the same types of principles described in relation to the first translation lookaside buffer may also be applied to the second translation lookaside buffer.

As shown, address translation cache 102 may include a plurality of lookup ports including a context input 308-1 and a virtual address input 308-2. These lookup ports are used to perform a lookup in the address translation cache 102. When performing a lookup, such as for a memory operation like a load or store, the context (identifying the relevant software instance or process) is provided to the context input 308-1, and the virtual address is provided to the virtual address input 308-2. Based on these inputs, address translation cache 102 determines if a corresponding mapping from the virtual address to a physical address is stored within its entries. If a match is found, the associated physical address is retrieved, allowing the memory operation to proceed.

As described above, each set within address translation cache 102 may include multiple entries, each of which may store at least a context identifier, a virtual address, and a corresponding physical address to which the virtual address is mapped. When a lookup is performed for a particular context and virtual address, address translation cache 102 may search its entries to find a matching mapping, providing the corresponding physical address if found. This process is efficient for memory operations like loads and stores, where a specific virtual address within the current context is being accessed, and the index for the relevant set can be quickly determined.

As has been described, however, address translation cache 102 may also be accessed during the carrying out of translation invalidation messages 106 received by core 202. These messages, such as TLBI messages, indicate that mappings for certain virtual addresses (potentially within a defined range and associated with a particular context) are to be invalidated within address translation cache 102. For a set-associative structure like address translation cache 102, invalidating entries based on a range of virtual addresses or for a context that may be spread across multiple sets requires scanning the sets to identify matching entries. This scanning process can be time-consuming and computationally expensive, potentially occupying the lookup ports of address translation cache 102 for an extended period. Accordingly, core 202 may be configured to provide translation invalidation filtering as described herein to avoid such delays.

As described above, context table 104 may serve as a specialized cache within the core, specifically designed to store identifiers for the contexts in which the core has operated. This can include the context that the core is currently executing within, as well as a history of recent contexts. By maintaining this information, the context table provides a quick and efficient means to determine if a received translation invalidation message (such as translation invalidation message 106-1 or 106-2) is relevant to the current or recent operational history of the core. One function of the context table 104 is to facilitate the filtering of translation invalidation messages. If a message relates to a context that is not recorded in the context table 104, it would be guaranteed that the address translation cache 102 does not contain any entries for that context. In such cases, the translation invalidation message can be immediately discharged without the potentially time-consuming task of accessing or scanning the address translation cache 102. As has been described, this approach may significantly reduce latency and processing overhead.

Context table 104 can take various forms, such as a small, low-latency cache or a dedicated register structure configured to store a limited number of context identifiers. The size of context table 104 can be selected based on the expected number of contexts a core might interact with over a relevant period. Accessing context table 104 can be performed with minimal latency, potentially within a single clock cycle, allowing for rapid determination of a message's potential relevance. This quick check using context table 104 enables translation invalidation controller 302 to make an informed decision about how to handle the incoming message: either proceed with the conventional processing (including accessing the address translation cache 102) if the context is found in the table (a hit in context table 104), or immediately discharge the message if the context is not present (a miss in context table 104). This filtering mechanism significantly improves processor performance by avoiding unnecessary work on irrelevant translation invalidation requests.

Building upon these concepts, a more specific illustration of a core's configuration, and the interaction between these components, is provided in FIG. 3B. FIG. 3B shows additional details regarding how certain elements of core 202, including the address translation cache 102 and context table 104, may be interconnected to facilitate methods and techniques described herein.

As illustrated in FIG. 3B, the translation invalidation controller 302 may be configured to receive translation invalidation messages 106. Upon receiving a message, the translation invalidation controller 302 can first access context table 104 to quickly determine whether there is at least a possibility that relevant entries are included in the address translation cache 102. To this end, translation invalidation controller 302 may initiate a query communication 314 to the context table 104. This lookup may be initiated on a single clock cycle basis that initiates a lookup within the context table 104 to check for the context associated with a received translation invalidation message.

In response to the query communication 314, translation invalidation controller 302 may receive, from the context table 104, a query response 316 as a result of its lookup operation. The query response 316 may include information about whether there is a record of the context associated with the translation invalidation message 106 in the context table 104. If the query response 316 indicates that the context was not found (a cache miss), the translation invalidation controller 302 may be configured to discharge the received translation invalidation message 106 without accessing the address translation cache 102 or any of its entries. Conversely, if the query response 316 indicates that there is at least a record of the context associated with the translation invalidation message 106 in the context table 104 (a cache hit), the translation invalidation controller 302 would then proceed in the conventional way to access the relevant entries (possibly scanning all the entries in the case of a translation invalidation message 106 having a range of addresses) in the address translation cache 102 to determine whether there are any relevant entries for the received translation invalidation message 106.

A first signal multiplexor 312-1 and a second signal multiplexor 312-2 are shown to select between different inputs to the address translation cache 102. This selection is guided by the query response 316 from the context table 104.

More particularly, a first signal multiplexor 312-1 may select a signal for context input 308-1 of the address translation cache 102. The first signal multiplexor 312-1 can select between a signal from current context register 306 when the context table misses (and thus a memory operation may be accessing address translation cache 102), and a context signal 318 from translation invalidation controller 302 when the context table hits and the translation invalidation task is being performed.

Similarly, a second signal multiplexor 312-2 may select a signal for virtual address input 308-2 of the address translation cache 102. The second signal multiplexor 312-2 can select between a signal 320 from memory operation controller 304 when the context table misses (and thus a memory operation may be accessing the cache 102), and a signal 322 when the context table hits and the translation invalidation task is being performed.

The signal from current context register 306 may represent the context identifier stored in the current context register. As described above, this signal can be selected by the first signal multiplexor 312-1 when a memory operation is accessing the address translation cache 102, and the context table indicates a miss for a translation invalidation message, ensuring that memory operations using the current context are not delayed by context table lookups.

Conversely, context signal 318 can be selected by the first signal multiplexor 312-1 when the context table indicates a hit for a translation invalidation message and the translation invalidation task is being performed. This signal carries the context identifier associated with the translation invalidation message, allowing the address translation cache 102 to be accessed based on that specific context.

Signal 320 from controller 304 can be selected by the second signal multiplexor 312-2 when a memory operation is accessing the address translation cache 102 (since the context table indicates a miss for a translation invalidation message). This signal may carry the virtual address associated with the memory operation, allowing the address translation cache 102 to perform a lookup for that address.

Conversely, signal 322 can be selected by the second signal multiplexor 312-2 when the context table indicates a hit for a translation invalidation message and a translation invalidation task associated with the translation invalidation message 106 is being performed. This signal may be used to carry various virtual addresses relevant to one or more translation invalidation tasks, enabling the address translation cache 102 to be accessed to invalidate entries for one or more addresses (e.g., an address range). For example, as has been described, for a particular context (represented by the context identifier carried in the context signal 318), translation invalidation controller 302 may drive signal 322 so as to walk through each of the sets of the address translation cache 102 to find matching virtual addresses within the address range specified by the translation invalidation task.

An output 324 of the address translation cache 102 provides a result (e.g., an entry accessed based on the signals being input to the lookup ports) to either the translation invalidation controller 302 or the memory operation controller 304, depending on the transaction being performed (e.g., either a translation invalidation message or a memory operation like a load or store or other memory transaction). This output 324 provides the result of an address translation lookup or an invalidation operation to either the translation invalidation controller 302 or the memory operation controller 304, depending on which component initiated the access to the address translation cache 102.

Figure 4:
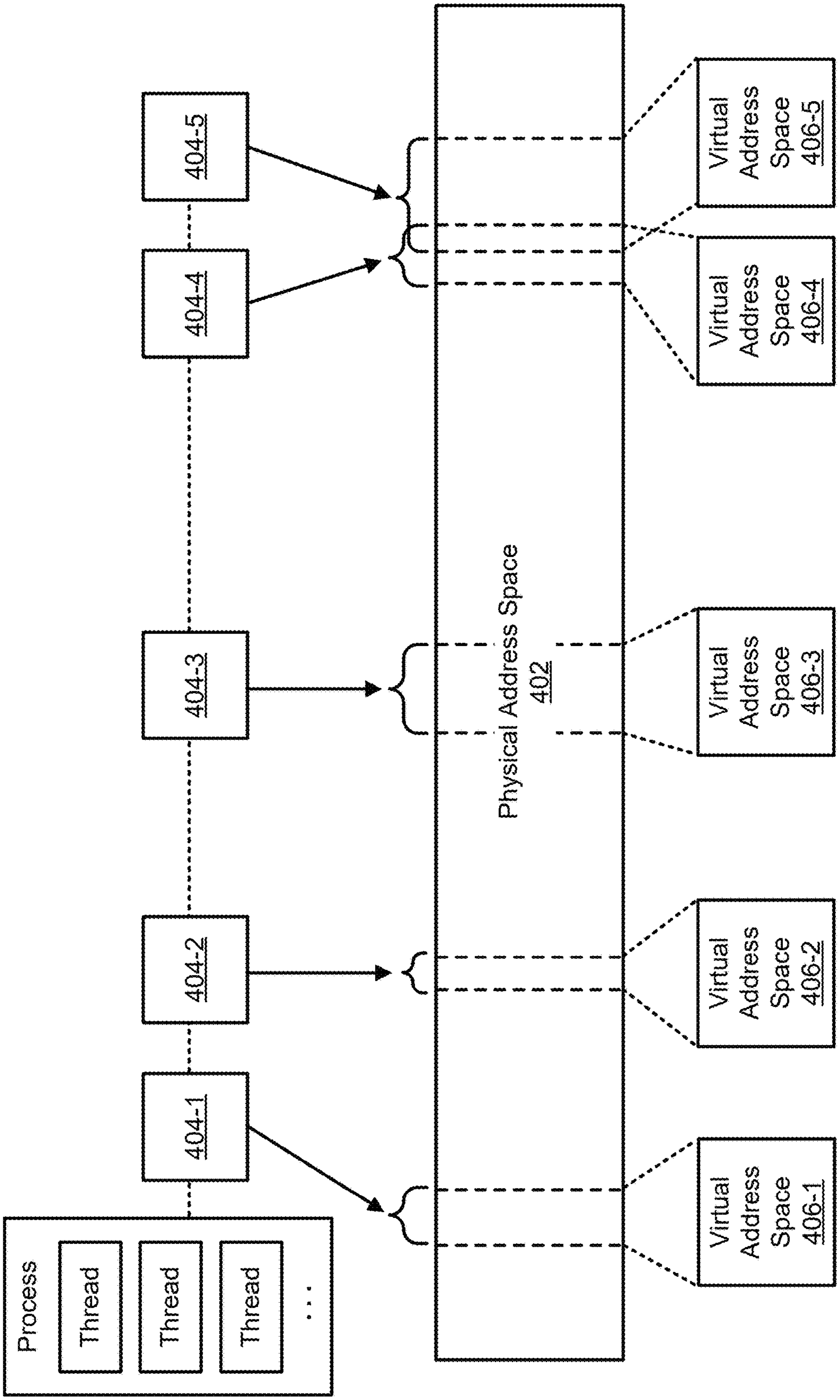
FIG. 4 shows illustrative aspects of various contexts that a processor core may switch between in accordance with principles described herein.

To better illustrate how contexts relate to address spaces and how a processor core operates within these different contexts, reference is now made to FIG. 4. FIG. 4 depicts illustrative aspects of various contexts that a processor core may switch between in accordance with principles described herein. As shown, FIG. 4 illustrates one unified physical address space 402 and a plurality of contexts 404-1, 404-2, 404-3, 404-4, and 404-5.

Each context 404-1 to 404-5 is associated with a corresponding virtual address space 406-1 to 406-5, which represents a range of virtual addresses used by the software instance or instances executing within that context (i.e., virtual address spaces 406-1 corresponding to context 404-1, virtual address space 406-2 corresponding to context 404-2, virtual address space 406-3 corresponding to context 404-3, virtual address space 406-4 corresponding to context 404-4, and virtual address space 406-5 corresponding to context 404-5). These virtual address spaces may be non-overlapping, as shown by virtual address spaces 406-1 to 406-3, or they may overlap, as illustrated by virtual address spaces 406-4 and 406-5. A processor core operates by executing instructions within these contexts, and references to memory or devices within a particular context's virtual address space are translated to corresponding physical addresses within the unified physical address space 402.

An example process is shown FIG. 4 to incorporate a plurality of threads. In general, a process may be associated with a particular virtual address space and the threads of that process may share that same virtual address space. Each of these processes or threads, however, may be considered to be its own context in certain implementations. For example, referring to the contexts specifically illustrated in FIG. 4, context 404-1 could represent one process and its associated threads, context 404-2 could represent a different process and its associated threads, and so forth. As another example, one or more of contexts 404-1 to 404-5 could represent individual threads of a single process. As shown, while each context 404-1 to 404-5 is associated with a corresponding virtual address space (e.g., virtual address spaces 406-1 to 406-5 in this example), these address spaces may be non-overlapping (e.g., virtual address space 406-1) or overlapping (e.g., virtual address spaces 406-4 and 406-5). In some examples, a virtual address space could be fully contained within a larger virtual address space (not explicitly shown in FIG. 4).

Thus, referring to the principles illustrated by FIG. 4, when a processor core operates in one context (e.g., context 404-1), the part of the physical address space 402 it references (e.g., virtual address space 406-1) may be different from when the processor core operates in a different context (e.g., context 404-2), where the part of the physical address space it references (e.g., virtual address space 406-2) uses some of the same virtual addresses to map to completely different physical addresses within physical address space 402. In the examples described above and the specific methods described below, it will thus be understood that a first context referred to may be associated with a first address range assigned to a first process or thread executing on the first core, a second context referred to may be associated with a second address range assigned to a second process or thread executing on the first core, and so forth.

A variety of illustrative implementations of translation invalidation filtering based on a context table within a processor core in accordance with principles described herein will now be described with respect to FIGS. 5A-5D and FIGS. 6A-6D. More particularly, FIGS. 5A-5D show illustrative methods 500-A to 500-D for translation invalidation filtering based on a context table, while FIGS. 6A-6D show illustrative operational diagrams 600-A to 600-D that correspond one-to-one with methods 500-A to 500-D of FIGS. 5A-5D. As shown, each operational diagram 600-A to 600-D includes the same elements as described above with reference to FIG. 3B (as well as FIGS. 2, 3A, etc.). These include various elements of a processor core such as: core 202, address translation cache 102, context table 104, translation invalidation controller 302, and so forth.

In each of methods 500-A to 500-D, the operations of the methods may be performed by a first core (a receiving core) of a processor that also includes other cores. More particularly, the operations of methods 500-A to 500-D could be performed by physical circuitry of translation invalidation controller 302 as it is integrated within the first core. While FIGS. 5A-5D show illustrative operations according to specific implementations, it will be understood that other implementations of these methods may omit, add to, reorder, and/or modify any of the operations that are explicitly represented in FIGS. 5A-5D. Additionally, while these operations are illustrated with arrows suggestive of a sequential order of operation, it will be understood that one or more of the operations may be performed concurrently (e.g., in parallel) with one another.

Figure 5A:
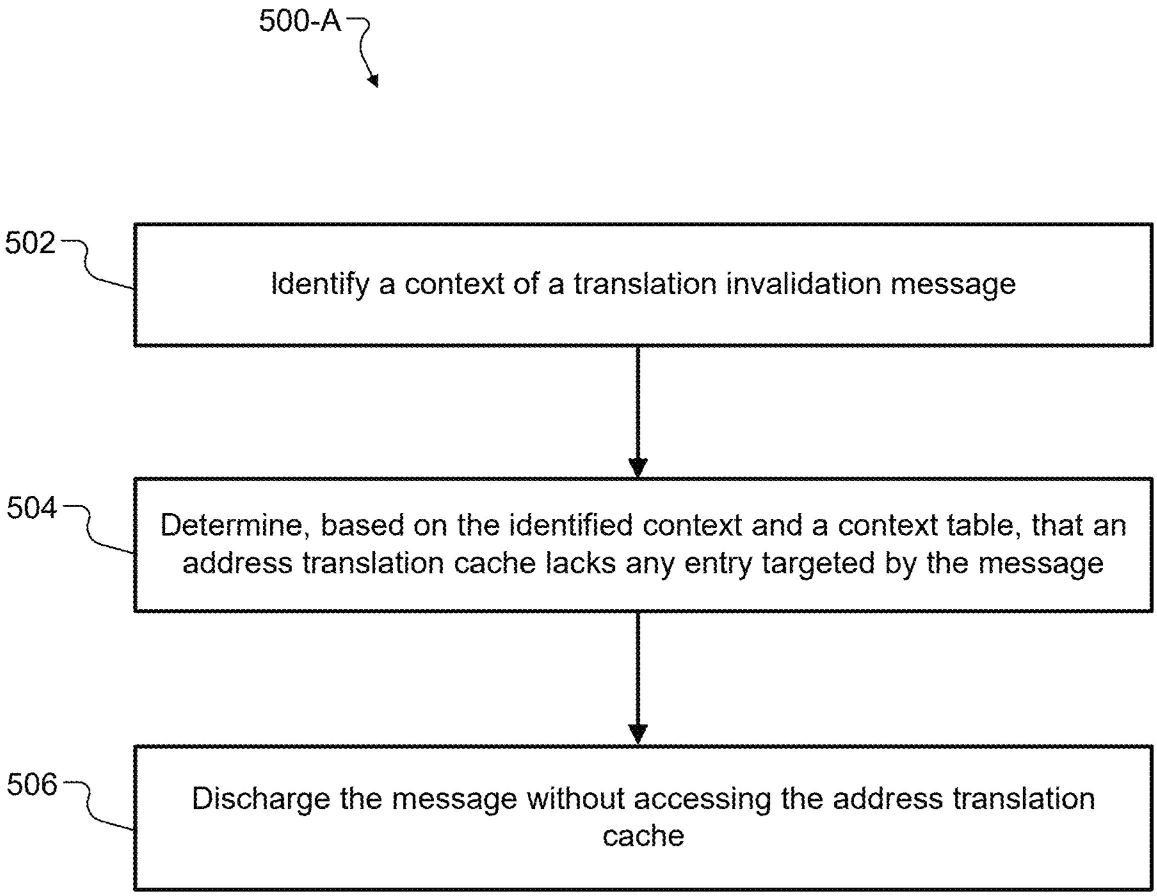
FIGS. 5A-5D show illustrative methods for translation invalidation filtering based on a context table within a processor core in accordance with principles described herein.

Referring to method 500-A in FIG. 5A, this method is similar to other methods and processes as have been described above for translation invalidation filtering based on a context table.

At operation 502, the first core of the processor (e.g., core 202) may identify a context of a translation invalidation message. For example, as described above with reference to FIG. 1, translation invalidation messages (e.g., translation invalidation messages 106, 106-1, and 106-2) may be received by the first core from another core of the processor. As one example, this could be the second core illustrated in FIG. 2 (e.g., core 202-2). As another example, this could be a different one of the plurality of cores of a processor (e.g., core 202-3). The context may be identified based on metadata included in the translation invalidation message and may be the same as or different from the current context in which the receiving core is operating.

At operation 504, the first core may determine, based on the identified context and a context table maintained within the first core (e.g., context table 104), that the address translation cache lacks any entry targeted by the translation invalidation message. For example, as described above with reference to FIG. 1, the context table may store identifiers for contexts in which the first core has operated. A determination may be made based on accessing the context table (e.g., using query communication 314) that the context identified at operation 502 is not present in the context table. This miss in the context table indicates that the address translation cache does not contain any entries for that context. Thus, this determination may be performed after receiving the translation invalidation message and accessing the context table.

At operation 506, based on the determination that the address translation cache lacks any entry targeted by the message, the first core may discharge the message without accessing the address translation cache (e.g., address translation cache 102). For example, as described above with reference to FIG. 1, if the context table indicates a miss (arrow 110-1) for the context associated with translation invalidation message 106-1, the message may be immediately discharged (arrow 112-1) without the translation invalidation controller 302 accessing or scanning the address translation cache 102. This avoids the potentially time-consuming process of scanning the address translation cache for entries to invalidate, providing efficiency gains as have been described.

Figure 6A:
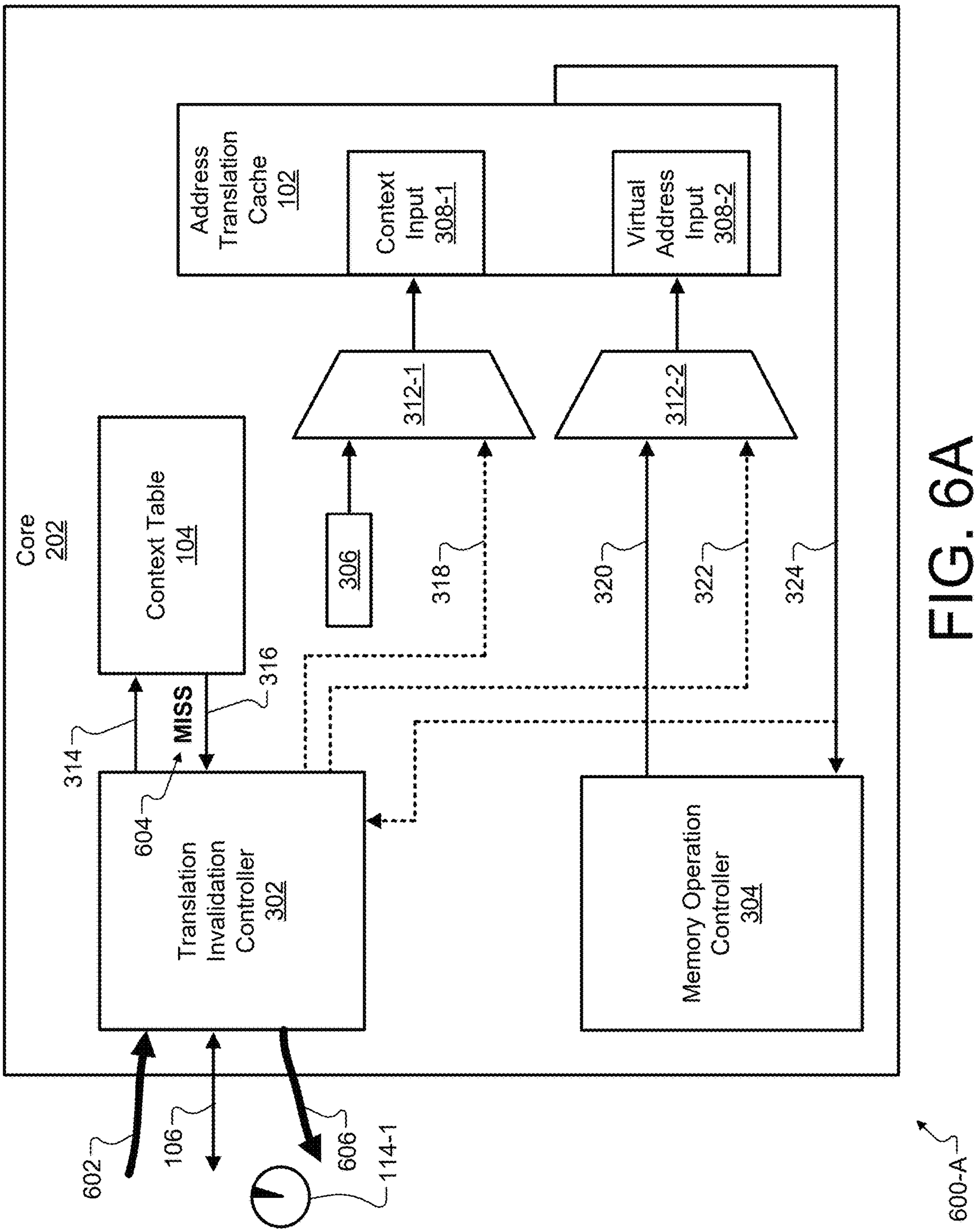
FIGS. 6A-6D show illustrative operational diagrams corresponding to the methods of FIGS. 5A-5D in accordance with principles described herein.

Turning now to operational diagram 600-A in FIG. 6A, this diagram illustrates the scenario described in method 500-A where a translation invalidation message associated with an orthogonal context is nullified. Similar to FIG. 3B, operational diagram 600-A depicts core 202, which includes translation invalidation controller 302, memory operation controller 304, address translation cache 102, and context table 104.

The core 202 receives an incoming translation invalidation message 602 (one of translation invalidation messages 106 described above), which indicates a context of an address translation entry that is to be invalidated. Following method 500-A, the translation invalidation controller 302 first identifies the context of the translation invalidation message 602 (operation 502). As indicated by query communication 314, the controller then accesses the context table 104 to determine if this context is present. The diagram shows that the context table 104 returns a "MISS" (indicated by label 604 associated with the query response 316), meaning the context is not found in the context table. Based on this determination that the address translation cache 102 lacks any entry targeted by the message (operation 504), the translation invalidation controller 302 discharges the message without accessing the address translation cache 102 (operation 506).

This nullification is visually represented by the acknowledgement 606 shown with the translation invalidation message flow, as well as the dotted lines from the translation invalidation controller 302, which will be understood to indicate no further processing directed to the address translation cache 102. The signal multiplexors 312-1 and 312-2 are shown here as receiving and passing through inputs for the memory operation controller 304 (indicated by solid, rather than dotted, lines), which will be understood to allow the memory operation controller 304 to access the address translation cache 102 via signal 320 and reliance on current context register 306. In this way, operational diagram 600-A illustrates how the translation invalidation filtering avoids interfering with ongoing memory operations.

Figure 5B:
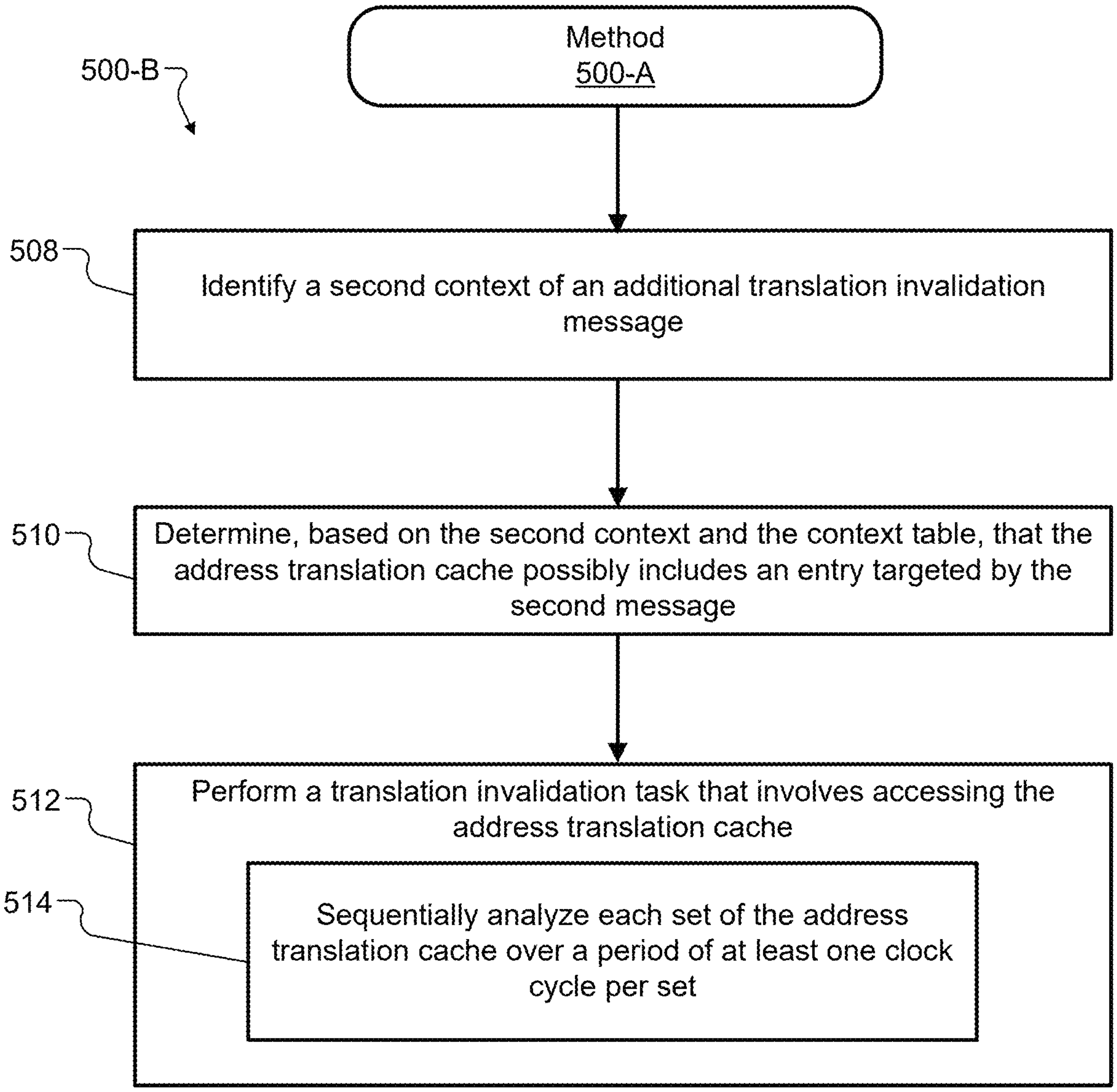

Referring now to method 500-B in FIG. 5B, this method covers a scenario where, unlike method 500-A, a quick context table lookup does not immediately indicate that an incoming translation invalidation message is irrelevant (as described above in relation to translation invalidation message 106-2). In this case, the address translation cache may possibly include an entry targeted by the message, thus requiring the core to perform the translation invalidation task more thoroughly.

At operation 508, the first core identifies a second context of an additional translation invalidation message. This operation is similar to operation 502 of method 500-A, where the context of an incoming translation invalidation message is identified. Here, the message is referred to as an "additional" message and its context as a "second" context to distinguish it from the scenario described in method 500-A, but the underlying process of extracting the context information from the message is similar.

At operation 510, the first core determines, based on the second context and the context table, that the address translation cache possibly includes an entry targeted by the second message. This determination is based on accessing the context table (e.g., context table 104) with the identified second context. If the context table indicates a hit (as opposed to the miss in method 500-A), it means that the first core has recently operated in this second context and that the address translation cache 102 has at least one entry associated with the second context. Therefore, there is a possibility that the address translation cache contains entries relevant to this context that might need to be invalidated according to the additional translation invalidation message. This outcome would thus require further action, in contrast to the immediate discharge in method 500-A.

At operation 512, based on the determination that the address translation cache possibly includes an entry targeted by the second message, the first core performs a translation invalidation task that involves accessing the address translation cache. Since a simple context table lookup cannot definitively rule out the presence of relevant entries, the core proceeds with the conventional method of processing the translation invalidation message. This involves interacting directly with the address translation cache to check for and invalidate any matching entries.

Operation 514 is shown to be a sub-operation of operation 512 (i.e., such that the performing of the translation invalidation task at operation 512 may include operation 514). As shown, operation 514 may involve sequentially analyzing each set of the address translation cache over a period of at least one clock cycle per set. Because the translation invalidation message may target a range of virtual addresses or multiple specific addresses within the identified second context, and the address translation cache is a set-associative structure, the core may examine each set to determine if any of its entries match the criteria specified in the message (context and virtual address range).

It will be understood that this sequential scanning of all sets in the address translation cache can take a significant amount of time (at least one clock cycle per set), especially for caches with many sets. This is the time-consuming operation that the filtering mechanism of method 500-A is designed to avoid. However, when the context table indicates a hit, this scanning is necessary to ensure correct system behavior and coherency of address translations across the processor. The fact that this conventional scanning is performed when needed is what allows all the benefits that were illustrated for method 500-A (and associated operational diagram 600-A), which illustrated how the majority of translation invalidation messages (those associated with orthogonal contexts) can be efficiently filtered and discharged.

Figure 6B:
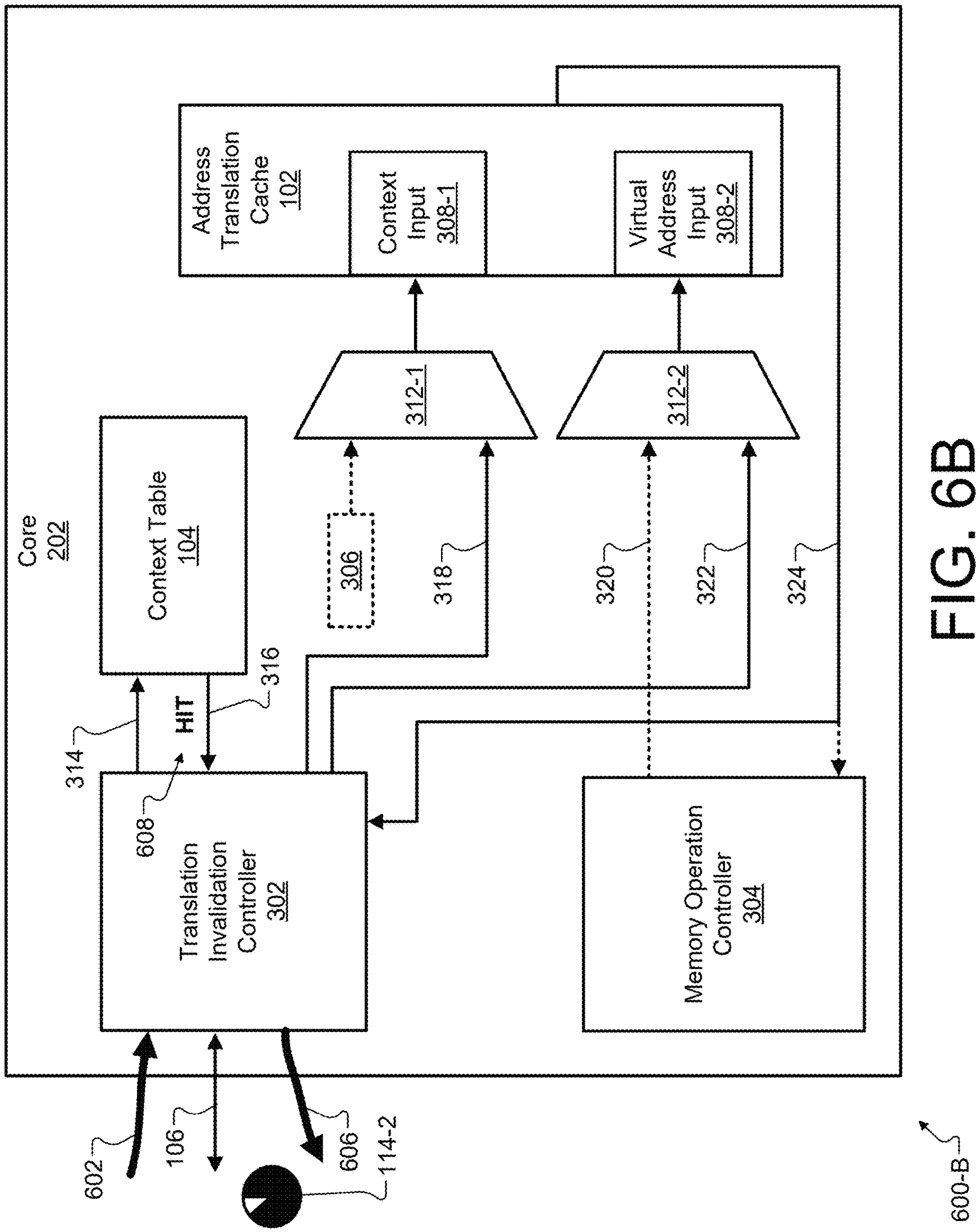

To further illustrate method 500-B, operational diagram 600-B in FIG. 6B depicts the scenario where the translation invalidation message's context is found in the context table. The translation invalidation controller 302 is shown to again receive a translation invalidation message 602 (one of translation invalidation messages 106) and to determine the context associated with the message (operation 508). Following the method, the translation invalidation controller 302 initiates a query communication 314 to the context table 104 with the context information from the message. In this scenario, however, the context table 104 returns a "HIT" (indicated by label 608 associated with query response 316), signifying that the core has operated in this context and thus the address translation cache 102 may contain relevant entries. In response to the hit (operation 510), the translation invalidation controller 302 proceeds to perform the translation invalidation task (operation 512), which involves accessing the address translation cache 102. As visually represented by the solid lines indicating data flow from the translation invalidation controller 302 to the address translation cache 102 through multiplexors 312-1 and 312-2, the address translation cache 102 is accessed while access by memory operation controller is paused (indicated by the dotted lines). This access may involve sequentially analyzing each set (operation 514), which is a multi-cycle operation that may be performed to complete the translation invalidation task when the context is deemed pertinent.

Figure 5C:
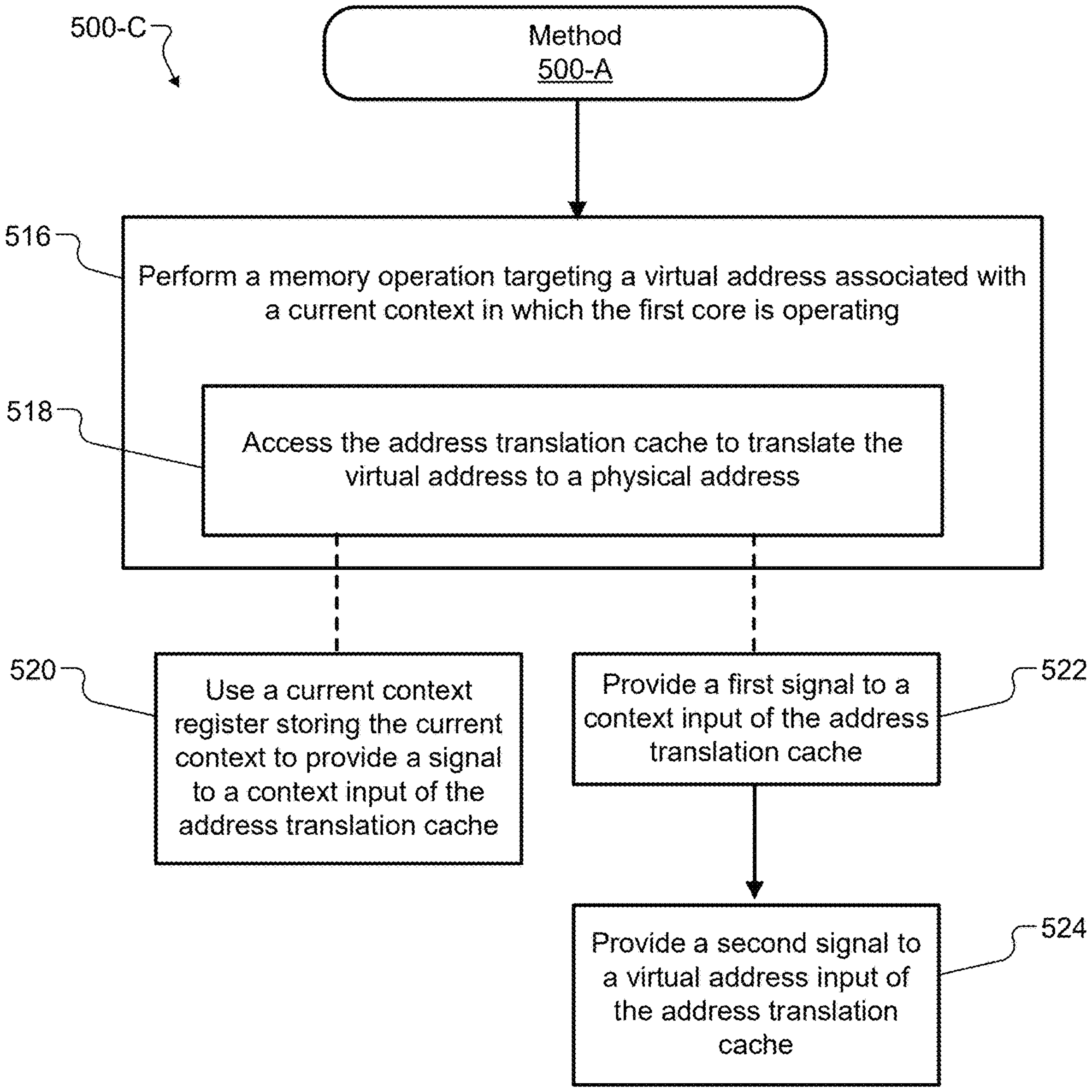

Referring now to method 500-C in FIG. 5C, this method illustrates how memory operation controller 304 may interact with address translation cache 102 using current context register 306. This figure focuses on the behavior of memory operation controller 304 and shows that its operation can be independent of the translation invalidation operations described in methods 500-A and 500-B.

At operation 516, a first core may perform a memory operation targeting a virtual address associated with a current context in which the first core is operating. For example, memory operation controller 304 may issue a load or store microoperation that requires translation of a virtual address to a physical address. This memory operation occurs within the current context of the first core, which is stored in current context register 306.

At operation 518, the first core may access the address translation cache (e.g., address translation cache 102) to translate the virtual address to a physical address. This is a standard function of the address translation cache, providing the physical address required for the memory operation to proceed. As shown, operation 518 may be a sub-operation of operation 516 (e.g., performed in the course of performing the memory operation). Dotted lines show possible ways that operation 518 may be implemented using operations 520-524.

At operation 520, the first core may use a current context register (e.g., current context register 306) storing the current context to provide a signal (e.g., representing a context identifier) to a context input (e.g., context input 308-1) of the address translation cache. As described above, current context register 306 may hold the identifier for the context the core is currently operating in. This identifier is used by memory operations to directly address the address translation cache without needing to consult the context table 104.

At operation 522, the first core may provide a first signal (e.g., selected by first signal multiplexor 312-1) to a context input of the address translation cache. This signal is the context identifier obtained from current context register 306, ensuring that the address translation cache lookup is performed for the correct context.

At operation 524, the first core may provide a second signal (e.g., selected by second signal multiplexor 312-2) to a virtual address input (e.g., virtual address input 308-2) of the address translation cache. This signal represents the virtual address that is to be translated as part of the memory operation.

Figure 6C:
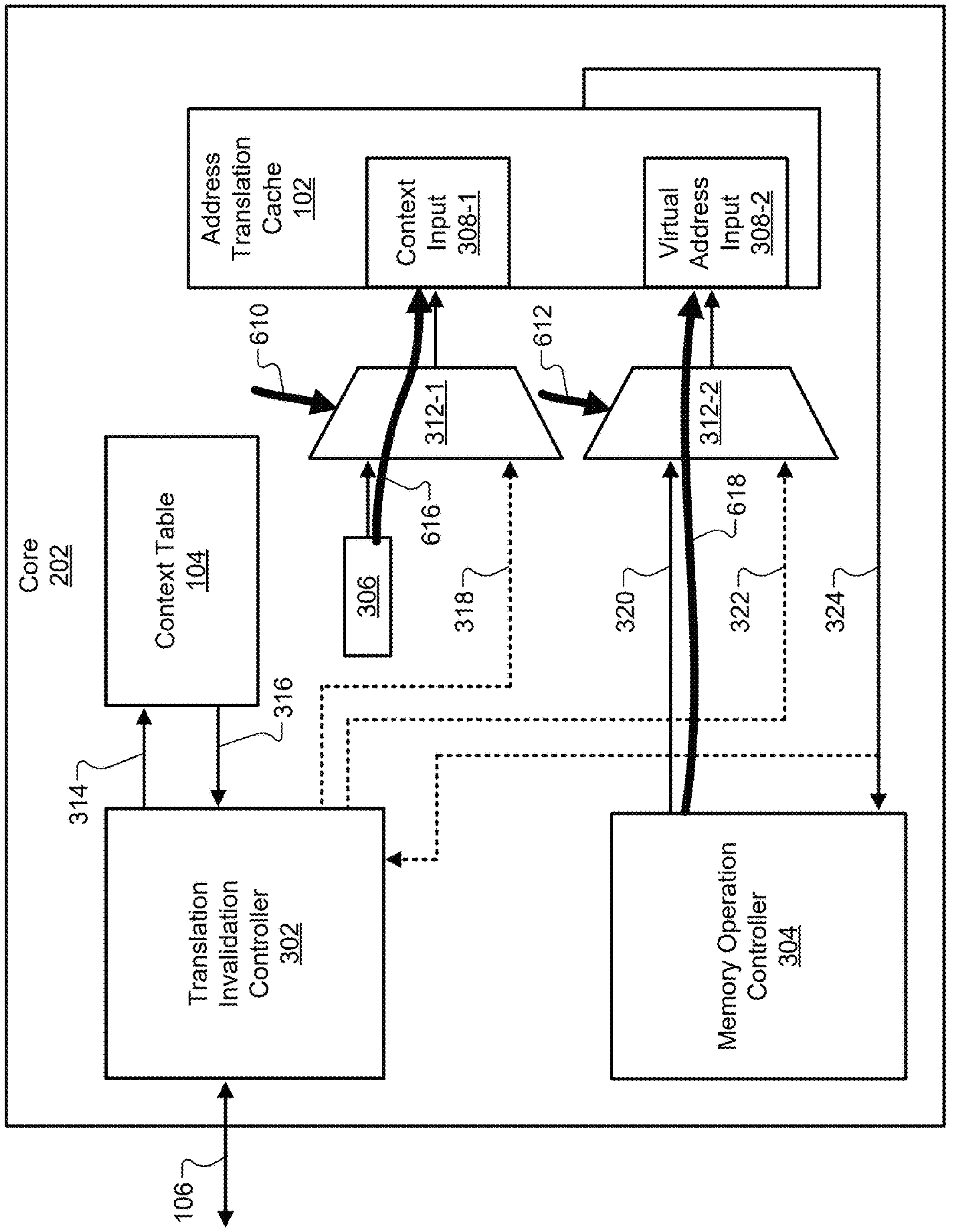

To further illustrate method 500-C, operational diagram 600-C in FIG. 6C depicts memory operation controller 304 initiating a memory operation. As indicated by mux control arrows 610 and 612, as well as by data flow arrows 616 and 618, memory operation controller 304 may provide the current context (via current context register 306 and first signal multiplexor 312-1), and a virtual address (via signal 320 and second signal multiplexor 312-2) to the lookup ports of address translation cache 102 (i.e., context input 308-1 and virtual address input 308-2, respectively). Since this is a standard memory operation within the current context, translation invalidation controller 302 is not involved, and context table 104 is not accessed by the memory operation controller. The memory operation controller 304 directly accesses address translation cache 102 (operation 518) using the signals provided (operations 520, 522, and 524), which are selected by multiplexors 312-1 and 312-2. This diagram emphasizes that ongoing memory operations are not interrupted by the presence of translation invalidation filtering mechanisms; they proceed as usual by utilizing the current context register and accessing the address translation cache directly.

Figure 5D:
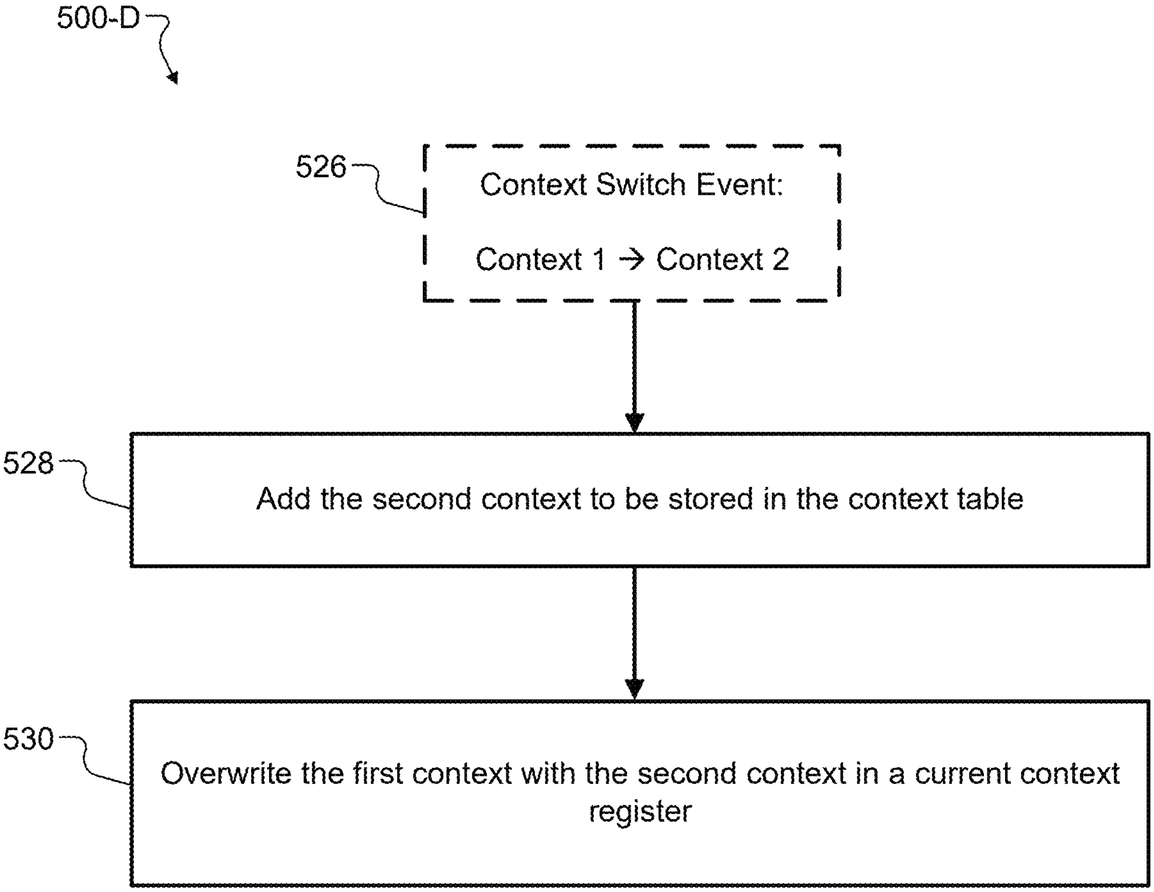

Referring now to method 500-D in FIG. 5D, this method details the process of updating the context information when a context switch event occurs. This method specifically focuses on how the context table and current context register are managed following a transition to a new operational context.

Note 526 indicates that a context switch event occurs in which the first core transitions from operating in a first context to operating in a second context. This event marks a change in the software instance or task being executed by the core, necessitating an update to the core's internal representation of its operating context.

At operation 528, the first core may add the second context (the new context) to be stored in the context table (e.g., context table 104). As described above, the context table is configured to cache contexts in which the first core has operated, allowing for quick checks of relevance for incoming translation invalidation messages. Thus, when the core switches to a new context, operation 528 is performed to add that context to the table to reflect its recent operational history.

At operation 530, the first core may overwrite the first context (the previous context before the context switch event) with the second context (the new context) in a current context register (e.g., current context register 306). The current context register specifically tracks the context in which the core is currently operating. With a context switch event, the previous context becomes inactive, and the new context becomes the current one, requiring the register's contents to be updated.

Figure 6D:
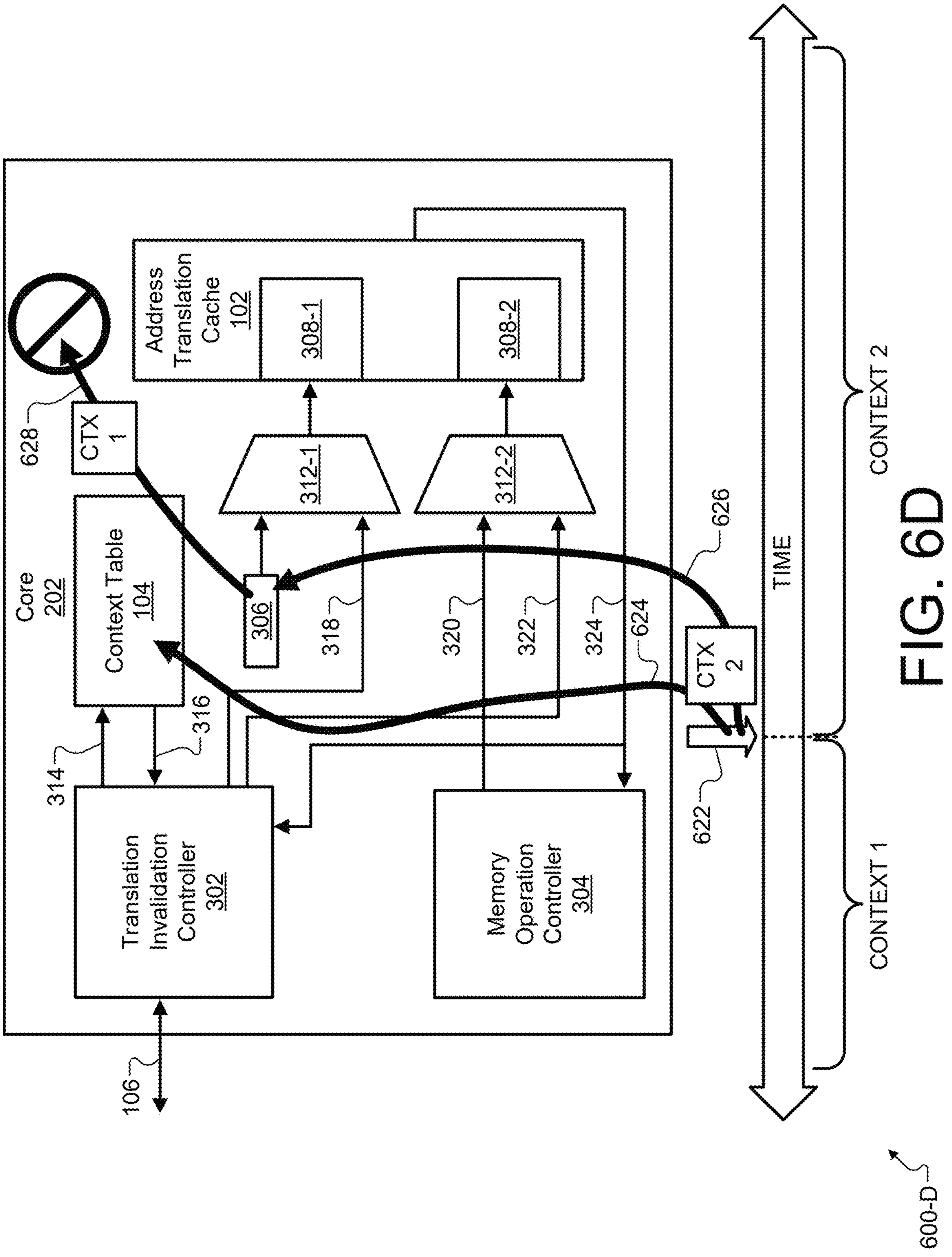

To further illustrate method 500-D, operational diagram 600-D in FIG. 6D depicts a context switch event 622, where the core transitions from operating in CONTEXT 1 to CONTEXT 2. Following this event, the diagram shows that the new context (CTX 2) is added to context table 104 (operation 528), as indicated by arrow 624 pointing from the context switch event 622 to the context table. Additionally, the content of current context register 306 is updated to reflect CONTEXT 2 (CTX 2) by overwriting the previous context (CTX 1), as shown by arrow 626 pointing from context switch event 622 to current context register 306, and arrow 628 showing that CTX 1 is removed from current context register 306 and overwritten (operation 530). This operational diagram visually represents how the context table and current context register are updated synchronously with a context switch event, ensuring that the core's context-aware mechanisms are accurately maintained.

As has been mentioned, various methods and processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory.

Figure 7:
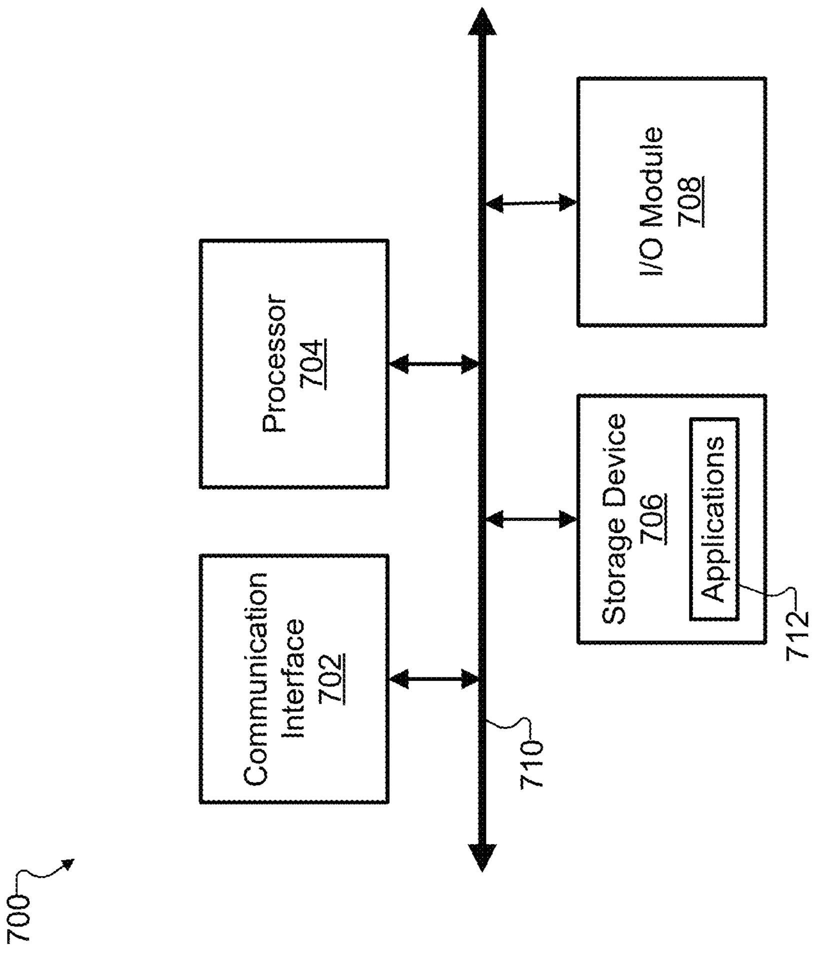
FIG. 7 shows an illustrative computing device that may use one or more processors such as those described herein.

FIG. 7 shows an illustrative computing device 700 that may use or implement one or more processors (e.g., CPUs, etc.) such as those described herein. As shown in FIG. 7, computing device 700 may include a communication interface 702, a processor 704 (which may represent an implementation of processor 200 with various components such as processor cores, a multi-access cache, a communication bus, a memory controller, etc.), a storage device 706, and an input/output (I/O) module 708 communicatively connected via a communication infrastructure 710. While an illustrative computing device 700 is shown in FIG. 7, the components illustrated in FIG. 7 are not intended to be limiting. Additional or alternative components may be used in other implementations. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. One or more I/O modules may be used to receive input for a single virtual experience. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O module 708 is configured to provide graphical data to a display for presentation to a user. The graphical data may be representative of one or more graphical user interfaces and/or any other graphical content as may serve a particular implementation.

The following clauses describe implementations of translation invalidation filtering based on a context table within a processor core in accordance with principles described herein.

Clause 1. A method comprising: identifying a context to which a message corresponds, the message being a translation invalidation message received by a first core of a processor from a second core of the processor; determining, based on the context to which the message corresponds and a context table configured to store contexts in which the first core has operated, that an address translation cache of the first core lacks any entry targeted by the message; and based on the determining that the address translation cache lacks any entry targeted by the message, discharging the message without accessing the address translation cache.

Clause 2. The method of clause 1, wherein the message is a first message, the context to which the first message corresponds is a first context, and the method further comprises: identifying a second context to which a second message corresponds, the second message being an additional translation invalidation message received by the first core; determining, based on the second context to which the second message corresponds and the context table, that the address translation cache possibly includes an entry targeted by the second message; and based on the determining that the address translation cache possibly includes an entry targeted by the second message, performing a translation invalidation task that involves accessing the address translation cache.

Clause 3. The method of clause 2, wherein: the address translation cache is a set-associative cache in which entries are indexed with respect to a plurality of sets; and the accessing the address translation cache includes sequentially analyzing each set of the plurality of sets with respect to the translation invalidation task, the plurality of sets being analyzed over a period of at least one clock cycle per set.

Clause 4. The method of clause 1, further comprising performing a memory operation targeting a virtual address associated with a current context in which the first core is operating, the performing of the memory operation including accessing the address translation cache to translate the virtual address to a physical address.

Clause 5. The method of clause 4, wherein the accessing of the address translation cache for the performing of the memory operation includes using a current context register storing the current context to provide a signal to a context input of the address translation cache.

Clause 6. The method of clause 4, wherein: the accessing of the address translation cache for the performing of the memory operation includes providing a first signal to a context input of the address translation cache and providing a second signal to a virtual address input of the address translation cache; the first signal is output by a first signal multiplexor controlled by a translation invalidation controller to select the first signal from a plurality of context signals; and the second signal is output by a second signal multiplexor controlled by the translation invalidation controller to select the second signal from a plurality of virtual address signals.

Clause 7. The method of clause 4, wherein the memory operation is one of: a load operation configured to read data from the physical address; or a store operation configured to write data to the physical address.

Clause 8. The method of clause 1, further comprising, in response to a context switch event in which the first core transitions from operating in a first context to operating in a second context different from the first context: adding the second context to be stored in the context table with the first context, the first context having been added to the context table previously; and overwriting the first context with the second context in a current context register, the current context register being included within the first core to indicate a current context in which the first core is operating.

Clause 9. A first core of a processor, the first core comprising: an address translation cache; a context table configured to store contexts in which the first core has operated; and a translation invalidation controller configured to: identify a context to which a message corresponds, the message being a translation invalidation message received by the first core from a second core of the processor;

determine, based on the context to which the message corresponds and the context table, that the address translation cache lacks any entry targeted by the message; and based on the determining that the address translation cache lacks any entry targeted by the message, discharge the message without accessing the address translation cache.

Clause 10. The first core of clause 9, wherein the message is a first message, the context to which the first message corresponds is a first context, and the translation invalidation controller is further configured to: identify a second context to which a second message corresponds, the second message being an additional translation invalidation message received by the first core; determine, based on the second context to which the second message corresponds and the context table, that the address translation cache possibly includes an entry targeted by the second message; and based on a determination that the address translation cache possibly includes an entry targeted by the second message, perform a translation invalidation task that involves accessing the address translation cache.

Clause 11. The first core of clause 9, wherein the translation invalidation controller is further configured to perform a memory operation targeting a virtual address associated with a current context in which the first core is operating, the performing of the memory operation including accessing the address translation cache to translate the virtual address to a physical address.

Clause 12. The first core of clause 11, wherein the accessing of the address translation cache for the performing of the memory operation includes using a current context register storing the current context to provide a signal to a context input of the address translation cache.

Clause 13. The first core of clause 11, wherein: the accessing of the address translation cache for the performing of the memory operation includes providing a first signal to a context input of the address translation cache and providing a second signal to a virtual address input of the address translation cache; the first signal is output by a first signal multiplexor controlled by the translation invalidation controller to select the first signal from a plurality of context signals; and the second signal is output by a second signal multiplexor controlled by the translation invalidation controller to select the second signal from a plurality of virtual address signals.

Clause 14. The first core of clause 9, wherein the translation invalidation controller is further configured, in response to a context switch event in which the first core transitions from operating in a first context to operating in a second context different from the first context, to: add the second context to be stored in the context table with the first context, the first context having been added to the context table previously; and overwrite the first context with the second context in a current context register, the current context register being included within the first core to indicate a current context in which the first core is operating.

Clause 15. The first core of clause 9, wherein the address translation cache is a set-associative cache in which entries are indexed with respect to a plurality of sets, each set being configured to store a plurality of entries.

Clause 16. The first core of clause 9, wherein: the address translation cache is a first translation lookaside buffer; and the first core further includes a second translation lookaside buffer, the second translation lookaside buffer having a greater capacity and slower response time than the first translation lookaside buffer.

Clause 17. A processor comprising: a first core including an address translation cache and a context table configured to store contexts in which the first core has operated; and a second core configured to dispatch a message to the first core, the message being a translation invalidation message; wherein, upon receiving the message from the second core, the first core is configured to: identify a context to which the message corresponds, determine, based on the context to which the message corresponds and the context table, that the address translation cache lacks any entry targeted by the message, and based on the determining that the address translation cache lacks any entry targeted by the message, discharge the message without accessing the address translation cache.

Clause 18. The processor of clause 17, wherein the message is a first message, the context to which the first message corresponds is a first context, and the first core is further configured to: identify a second context to which a second message corresponds, the second message being an additional translation invalidation message received by the first core; determine, based on the second context to which the second message corresponds and the context table, that the address translation cache possibly includes an entry targeted by the second message; and based on a determination that the address translation cache possibly includes an entry targeted by the second message, perform a translation invalidation task that involves accessing the address translation cache.

Clause 19. The processor of clause 17, wherein the address translation cache is a set-associative cache in which entries are indexed with respect to a plurality of sets, each set being configured to store a plurality of entries.

Clause 20. The processor of clause 17, wherein: the address translation cache is a first translation lookaside buffer; and the first core further includes a second translation lookaside buffer, the second translation lookaside buffer having a greater capacity and slower response time than the first translation lookaside buffer.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the description and claims. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Specific structural and functional details disclosed herein are merely representative for purposes of describing example implementations. Example implementations, however, may be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized, or location information may be obtained (such as to a city, zip code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A method comprising:

identifying a context to which a message corresponds, the message being a translation invalidation message received by a first core of a processor from a second core of the processor;

determining, based on the context to which the message corresponds and a context table configured to store contexts in which the first core has operated, that an address translation cache of the first core lacks any entry targeted by the message; and based on the determining that the address translation cache lacks any entry targeted by the message, discharging the message without accessing the address translation cache.

2. The method of claim 1, wherein the message is a first message, the context to which the first message corresponds is a first context, and the method further comprises:

identifying a second context to which a second message corresponds, the second message being an additional translation invalidation message received by the first core;

determining, based on the second context to which the second message corresponds and the context table, that the address translation cache possibly includes an entry targeted by the second message; and based on the determining that the address translation cache possibly includes an entry targeted by the second message, performing a translation invalidation task that involves accessing the address translation cache.

3. The method of claim 2, wherein:

the address translation cache is a set-associative cache in which entries are indexed with respect to a plurality of sets; and the accessing the address translation cache includes sequentially analyzing each set of the plurality of sets with respect to the translation invalidation task, the plurality of sets being analyzed over a period of at least one clock cycle per set.

4. The method of claim 1, further comprising performing a memory operation targeting a virtual address associated with a current context in which the first core is operating, the performing of the memory operation including accessing the address translation cache to translate the virtual address to a physical address.

5. The method of claim 4, wherein the accessing of the address translation cache for the performing of the memory operation includes using a current context register storing the current context to provide a signal to a context input of the address translation cache.

6. The method of claim 4, wherein:

the accessing of the address translation cache for the performing of the memory operation includes providing a first signal to a context input of the address translation cache and providing a second signal to a virtual address input of the address translation cache;

the first signal is output by a first signal multiplexor controlled by a translation invalidation controller to select the first signal from a plurality of context signals; and the second signal is output by a second signal multiplexor controlled by the translation invalidation controller to select the second signal from a plurality of virtual address signals.

7. The method of claim 4, wherein the memory operation is one of:

a load operation configured to read data from the physical address; or a store operation configured to write data to the physical address.

8. The method of claim 1, further comprising, in response to a context switch event in which the first core transitions from operating in a first context to operating in a second context different from the first context:

adding the second context to be stored in the context table with the first context, the first context having been added to the context table previously; and overwriting the first context with the second context in a current context register, the current context register being included within the first core to indicate a current context in which the first core is operating.

9. A first core of a processor, the first core comprising:

an address translation cache;

a context table configured to store contexts in which the first core has operated; and a translation invalidation controller configured to:

identify a context to which a message corresponds, the message being a translation invalidation message received by the first core from a second core of the processor;

determine, based on the context to which the message corresponds and the context table, that the address translation cache lacks any entry targeted by the message; and based on the determining that the address translation cache lacks any entry targeted by the message, discharge the message without accessing the address translation cache.

10. The first core of claim 9, wherein the message is a first message, the context to which the first message corresponds is a first context, and the translation invalidation controller is further configured to:

identify a second context to which a second message corresponds, the second message being an additional translation invalidation message received by the first core;

determine, based on the second context to which the second message corresponds and the context table, that the address translation cache possibly includes an entry targeted by the second message; and based on a determination that the address translation cache possibly includes an entry targeted by the second message, perform a translation invalidation task that involves accessing the address translation cache.

11. The first core of claim 9, wherein the translation invalidation controller is further configured to perform a memory operation targeting a virtual address associated with a current context in which the first core is operating, the performing of the memory operation including accessing the address translation cache to translate the virtual address to a physical address.

12. The first core of claim 11, wherein the accessing of the address translation cache for the performing of the memory operation includes using a current context register storing the current context to provide a signal to a context input of the address translation cache.

13. The first core of claim 11, wherein:

the accessing of the address translation cache for the performing of the memory operation includes providing a first signal to a context input of the address translation cache and providing a second signal to a virtual address input of the address translation cache;

the first signal is output by a first signal multiplexor controlled by the translation invalidation controller to select the first signal from a plurality of context signals; and the second signal is output by a second signal multiplexor controlled by the translation invalidation controller to select the second signal from a plurality of virtual address signals.

14. The first core of claim 9, wherein the translation invalidation controller is further configured, in response to a context switch event in which the first core transitions from operating in a first context to operating in a second context different from the first context, to:

add the second context to be stored in the context table with the first context, the first context having been added to the context table previously; and overwrite the first context with the second context in a current context register, the current context register being included within the first core to indicate a current context in which the first core is operating.

15. The first core of claim 9, wherein the address translation cache is a set-associative cache in which entries are indexed with respect to a plurality of sets, each set being configured to store a plurality of entries.

16. The first core of claim 9, wherein:

the address translation cache is a first translation lookaside buffer; and the first core further includes a second translation lookaside buffer, the second translation lookaside buffer having a greater capacity and slower response time than the first translation lookaside buffer.

17. A processor comprising:

a first core including an address translation cache and a context table configured to store contexts in which the first core has operated; and a second core configured to dispatch a message to the first core, the message being a translation invalidation message;

wherein, upon receiving the message from the second core, the first core is configured to:

identify a context to which the message corresponds, determine, based on the context to which the message corresponds and the context table, that the address translation cache lacks any entry targeted by the message, and based on the determining that the address translation cache lacks any entry targeted by the message, discharge the message without accessing the address translation cache.

18. The processor of claim 17, wherein the message is a first message, the context to which the first message corresponds is a first context, and the first core is further configured to:

identify a second context to which a second message corresponds, the second message being an additional translation invalidation message received by the first core;

determine, based on the second context to which the second message corresponds and the context table, that the address translation cache possibly includes an entry targeted by the second message; and based on a determination that the address translation cache possibly includes an entry targeted by the second message, perform a translation invalidation task that involves accessing the address translation cache.

19. The processor of claim 17, wherein the address translation cache is a set-associative cache in which entries are indexed with respect to a plurality of sets, each set being configured to store a plurality of entries.

20. The processor of claim 17, wherein:

the address translation cache is a first translation lookaside buffer; and the first core further includes a second translation lookaside buffer, the second translation lookaside buffer having a greater capacity and slower response time than the first translation lookaside buffer.

* * * * *